(12) United States Patent
Baldo et al.

(10) Patent No.: US 10,201,243 B2
(45) Date of Patent: Feb. 12, 2019

(54) BREWING UNTI WITH A WATER HEATER

(75) Inventors: Massimo Baldo, Qinto di Treviso (IT);
Marco Santini, Breda di Piave (IT)

(73) Assignee: KONINKLIJKE PHILIPS N.V.,
Eindhoven (NL)

( * ) Notice: Subject to any disclaimer, the term of this patent is extended or adjusted under 35 U.S.C. 154(b) by 605 days.

(21) Appl. No.: 14/131,111

(22) PCT Filed: Jul. 4, 2012

(86) PCT No.: PCT/IB2012/053403
§ 371 (c)(1),
(2), (4) Date: Jan. 6, 2014

(87) PCT Pub. No.: WO2013/008141
PCT Pub. Date: Jan. 17, 2013

(65) Prior Publication Data
US 2014/0130679 A1  May 15, 2014

Related U.S. Application Data

(60) Provisional application No. 61/506,244, filed on Jul. 11, 2011.

(30) Foreign Application Priority Data

Jul. 8, 2011  (EP) .................................... 11173201

(51) Int. Cl.
A47J 31/36 (2006.01)
A47J 31/54 (2006.01)
A47J 31/60 (2006.01)

(52) U.S. Cl.
CPC ........... *A47J 31/36* (2013.01); *A47J 31/3633* (2013.01); *A47J 31/3638* (2013.01);
(Continued)

(58) Field of Classification Search
CPC ........ A47J 31/36; A47J 31/54; A47J 31/3633; A47J 31/3676; A47J 31/542; A47J 31/3638; A47J 31/60
(Continued)

(56) References Cited

U.S. PATENT DOCUMENTS 3,266,410 A * 8/1966 Novi .................... A47J 31/3609
222/334
4,724,752 A * 2/1988 Aliesch ............... A47J 31/3628
99/289 R
(Continued)

FOREIGN PATENT DOCUMENTS

WO  WO 2008152484 A2 * 12/2008 ............ A47J 31/005
WO  2011077349 A2  6/2011

*Primary Examiner* — Ibrahime A Abraham
*Assistant Examiner* — Biniam Asmelash

(57) ABSTRACT

A brewing unit includes a brewing chamber with first and second brewing chamber portions movable one with respect to the other, and a water heater. Further, the brewing unit includes a structural frame supporting the two brewing chamber portions, and on which forces generated by the pressurized water in the brewing chamber during brewing are discharged. The structural frame includes two side components arranged sideways of the brewing chamber, and two end components mechanically constrained to the side components. One of the two end components includes the first brewing chamber portion. Further, the side components and the end components form a closed structure, whereto the water heater is in turn constrained independently, with separate constraining members, from the first brewing chamber portion and adjacent thereto, outside the closed structure. The forces generated by the pressurized water in the brewing chamber during brewing are also discharged on the water heater.

20 Claims, 21 Drawing Sheets

(52) U.S. Cl.
CPC ........... *A47J 31/3676* (2013.01); *A47J 31/54* (2013.01); *A47J 31/542* (2013.01); *A47J 31/60* (2013.01)

(58) Field of Classification Search
USPC ....... 99/287, 320 P, 290, 295, 300, 288, 279
See application file for complete search history.

(56) References Cited

U.S. PATENT DOCUMENTS

| | | | | |
|---|---|---|---|---|
| 4,934,258 A | * | 6/1990 | Versini | A47J 31/3614 99/289 R |
| 5,657,683 A | * | 8/1997 | Sandei | A47J 31/54 99/287 |
| 6,116,147 A | * | 9/2000 | Schmed | A47J 31/3609 99/287 |
| 6,129,006 A | | 10/2000 | Schmed | |
| 6,584,888 B2 | * | 7/2003 | Cortese | A47J 31/3633 99/289 R |
| 7,531,198 B2 | * | 5/2009 | Cortese | A47J 31/3628 426/433 |
| 8,240,245 B2 | * | 8/2012 | Doglioni Majer | A47J 31/3614 99/289 R |
| 2005/0129809 A1 | * | 6/2005 | Cortese | A47J 31/3628 426/77 |
| 2008/0041234 A1 | * | 2/2008 | Cortese | A47J 31/0673 99/290 |
| 2009/0035438 A1 | * | 2/2009 | Cortese | A47J 31/3633 426/590 |
| 2012/0060698 A1 | * | 3/2012 | Baldo | A47J 31/0668 99/295 |
| 2013/0112082 A1 | * | 5/2013 | Baldo | A47J 31/3685 99/290 |
| 2013/0239820 A1 | * | 9/2013 | Baldo | A47J 31/3633 99/295 |
| 2015/0157169 A1 | * | 6/2015 | Kruger | A47J 31/4492 426/232 |

* cited by examiner

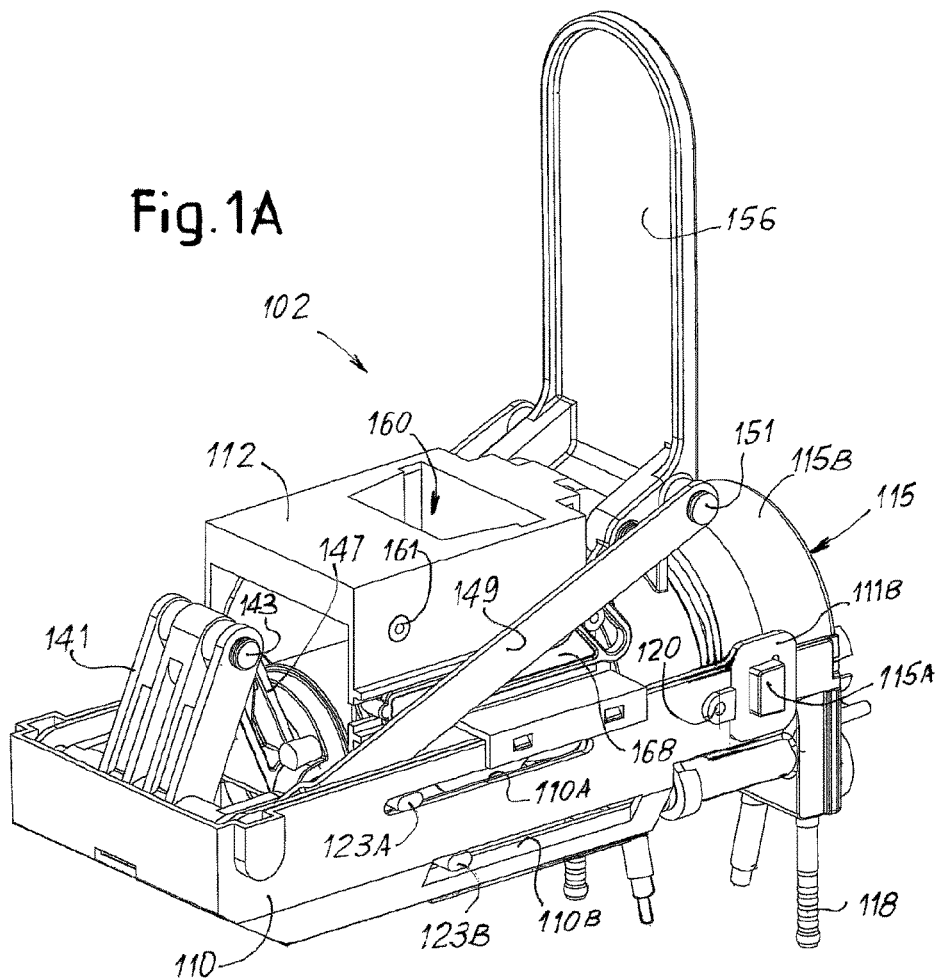
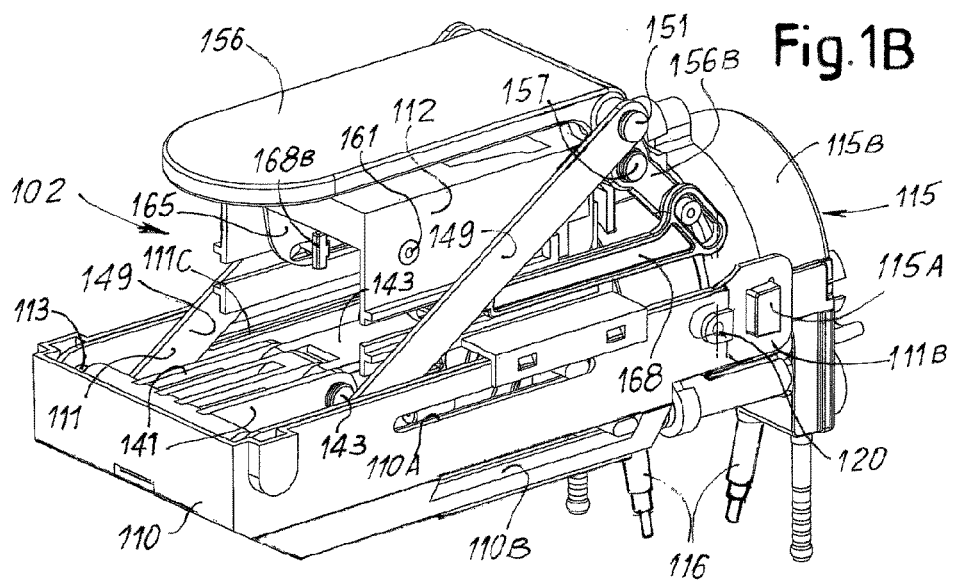

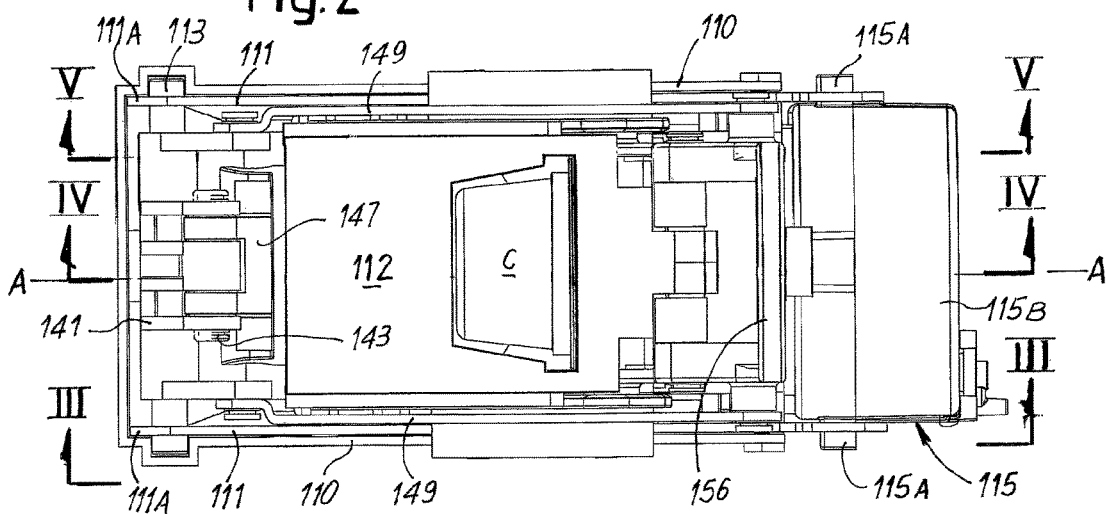
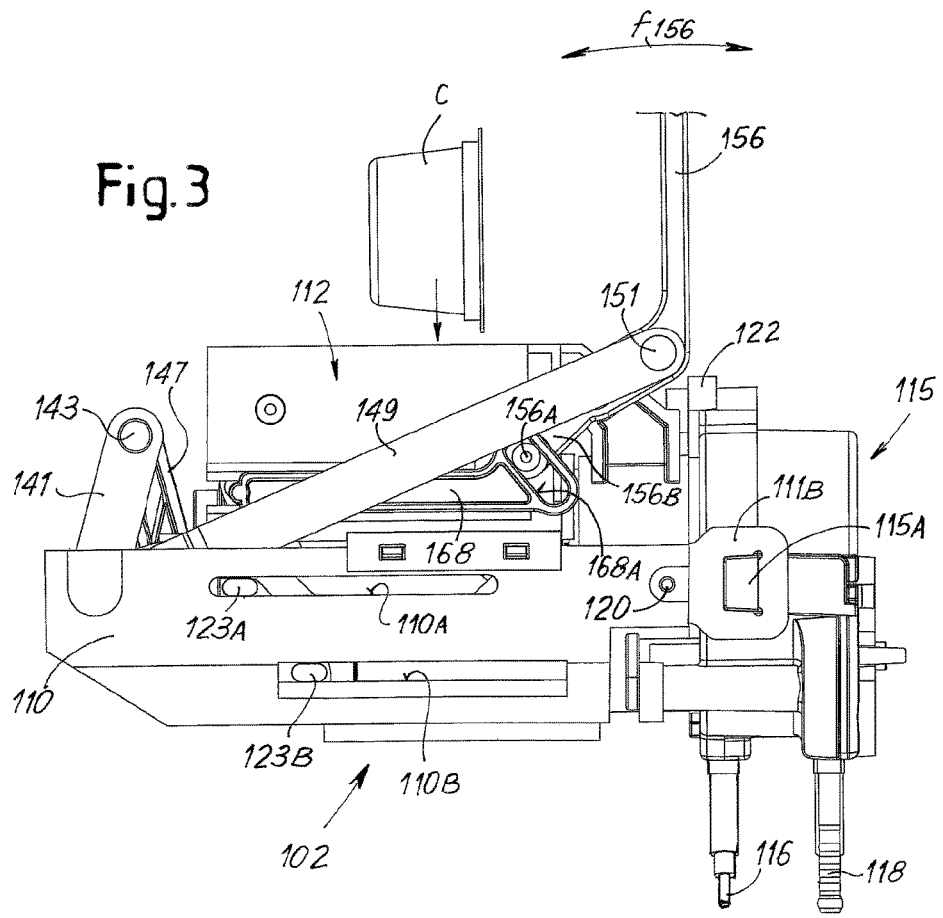

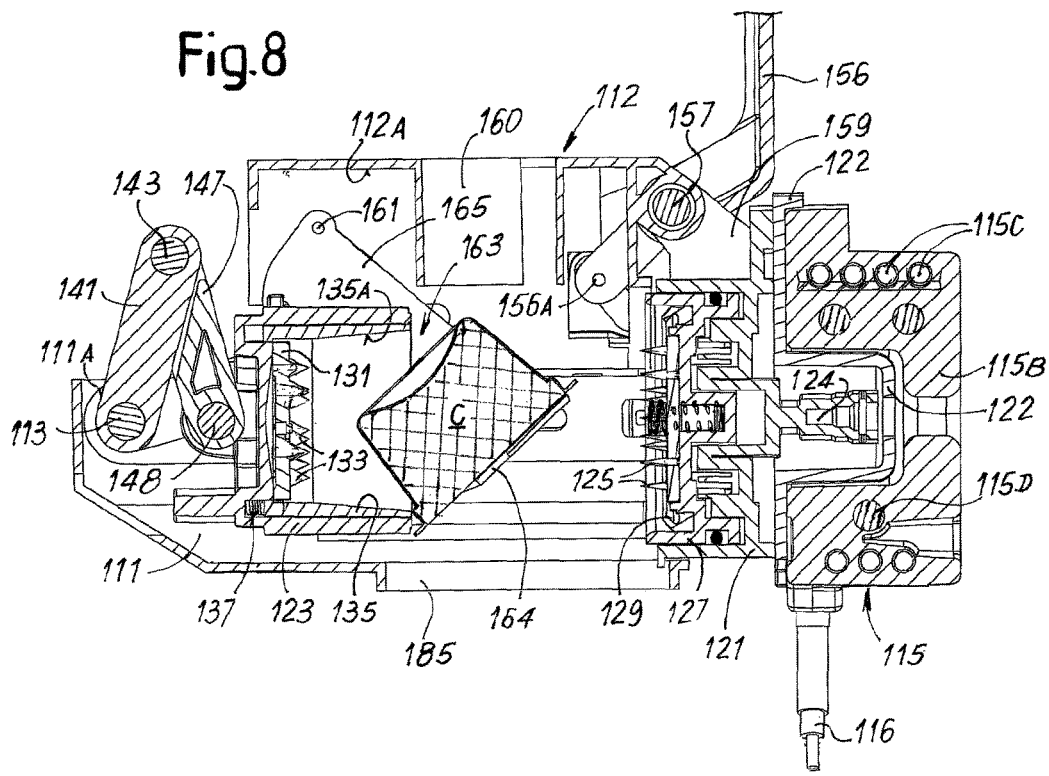
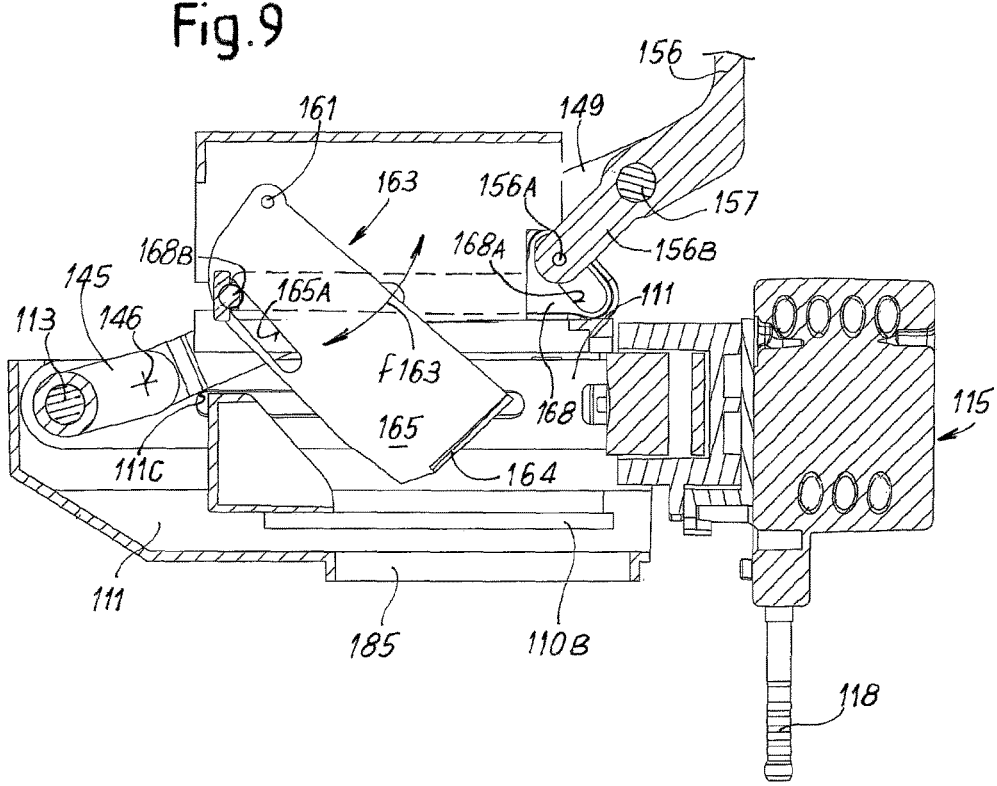

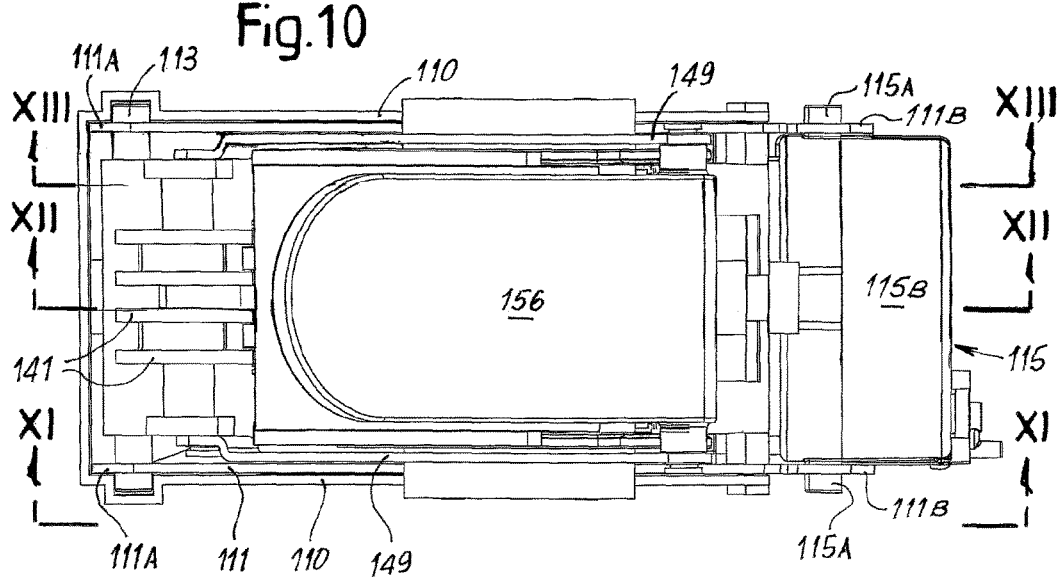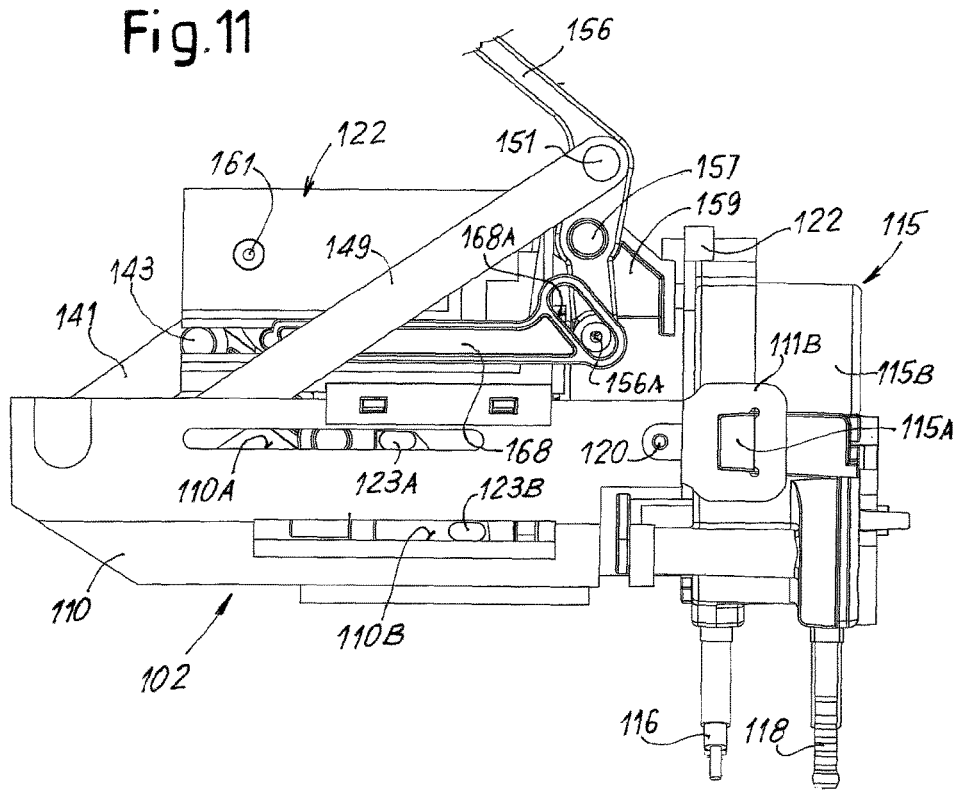

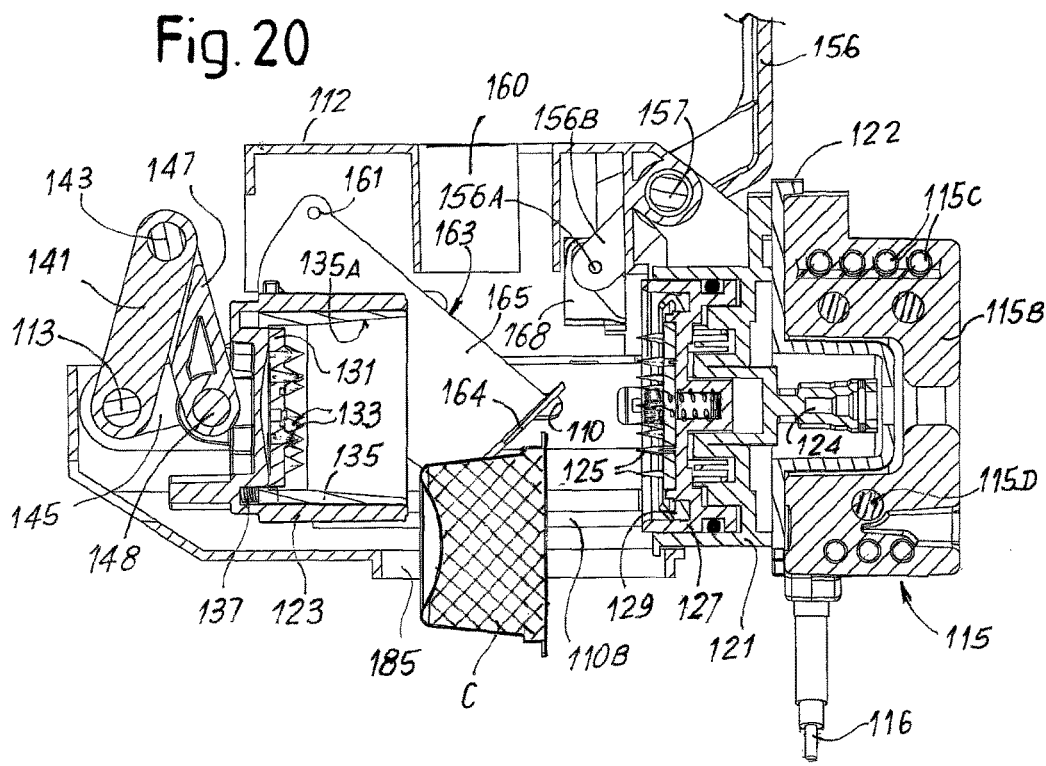
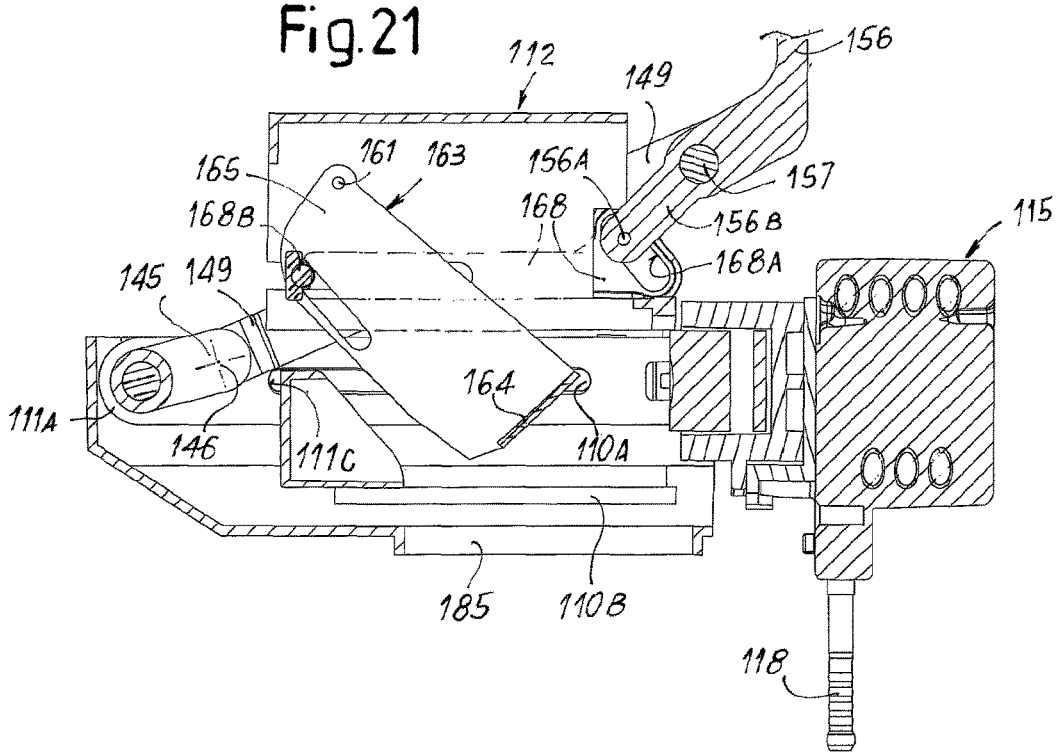

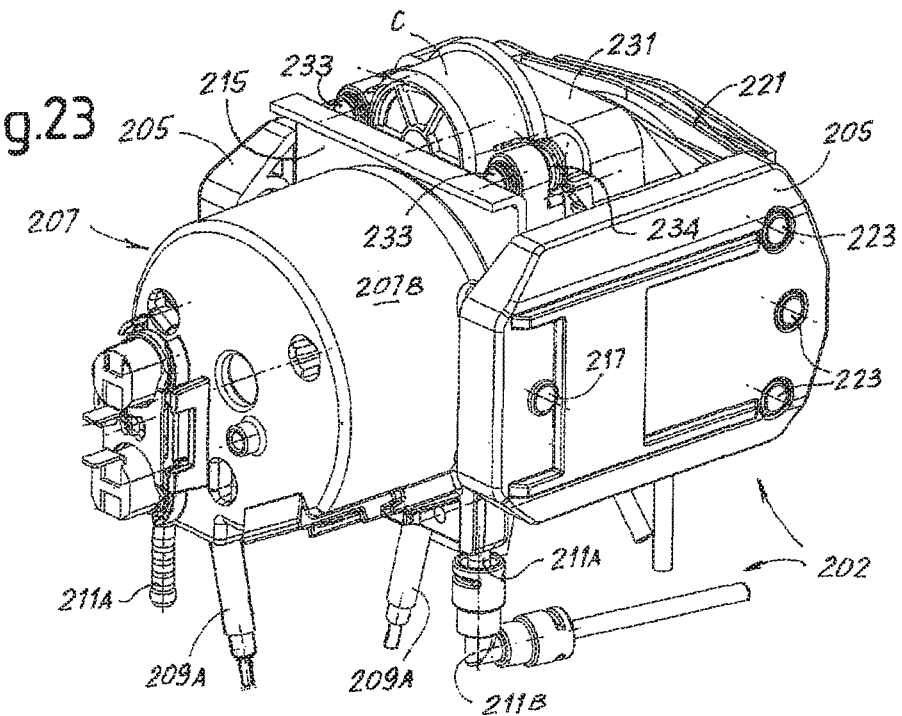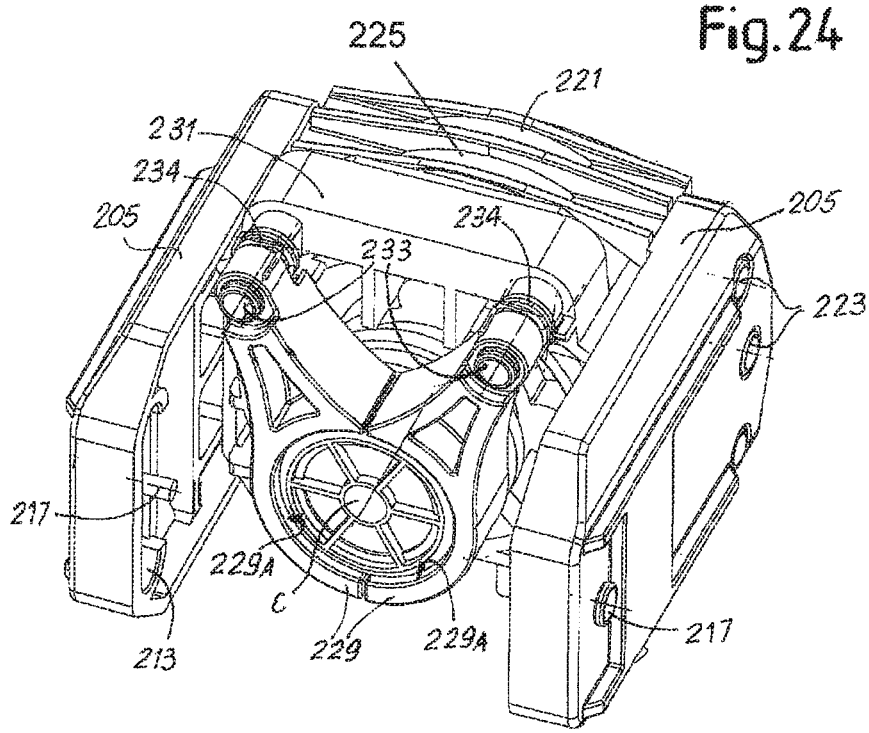

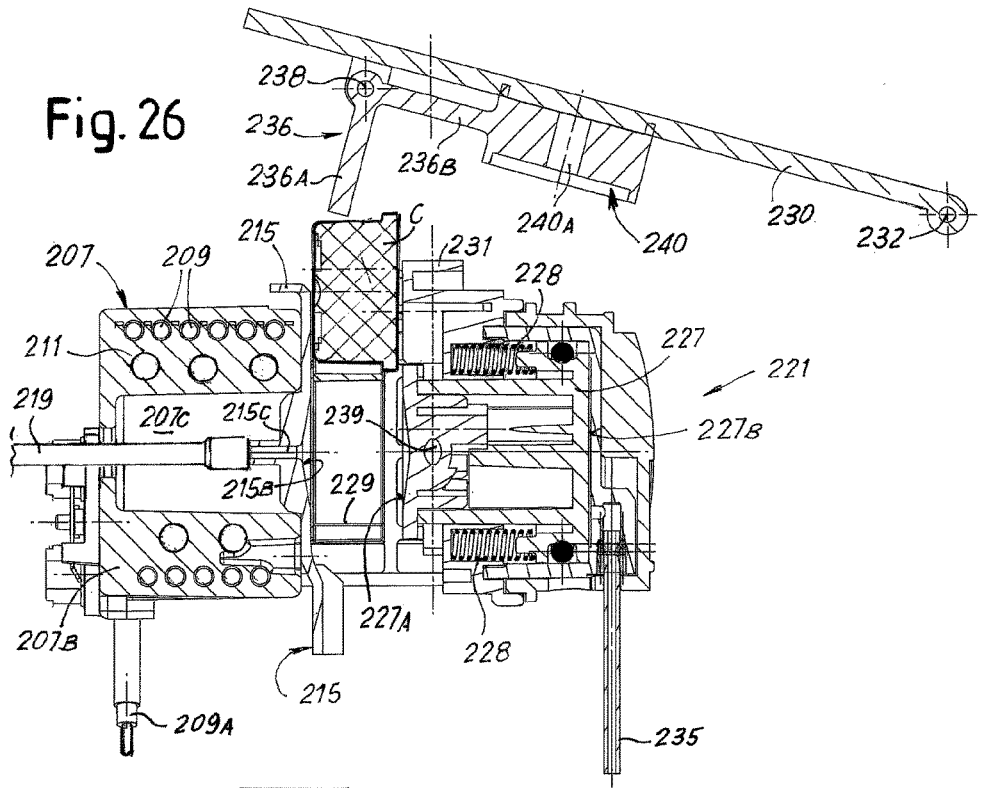
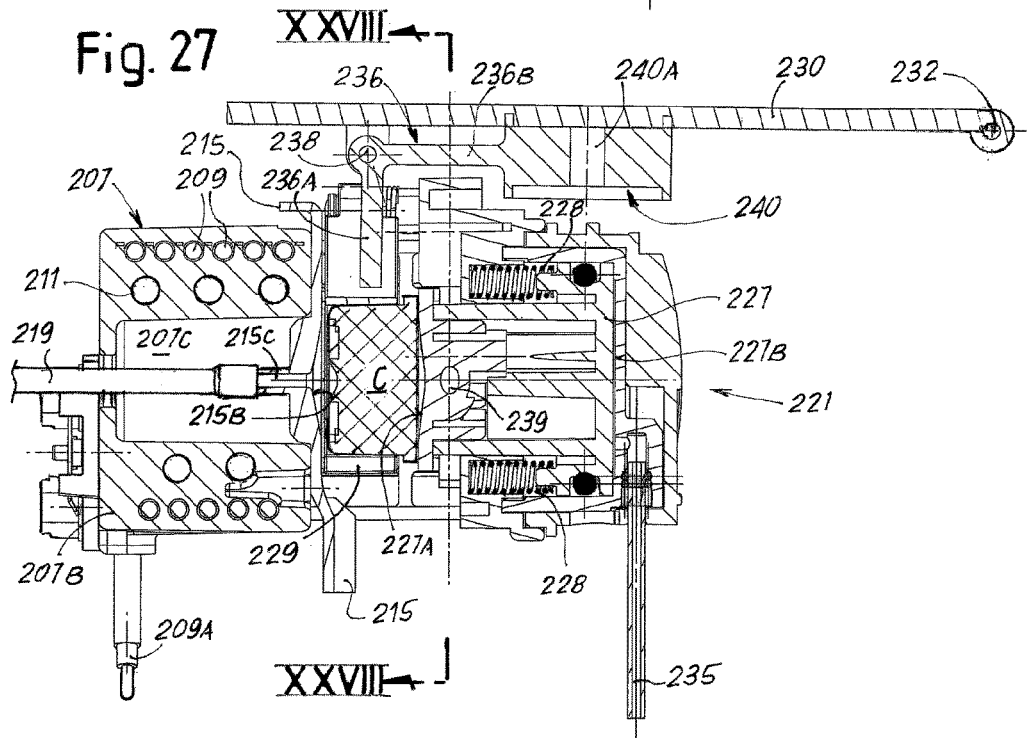

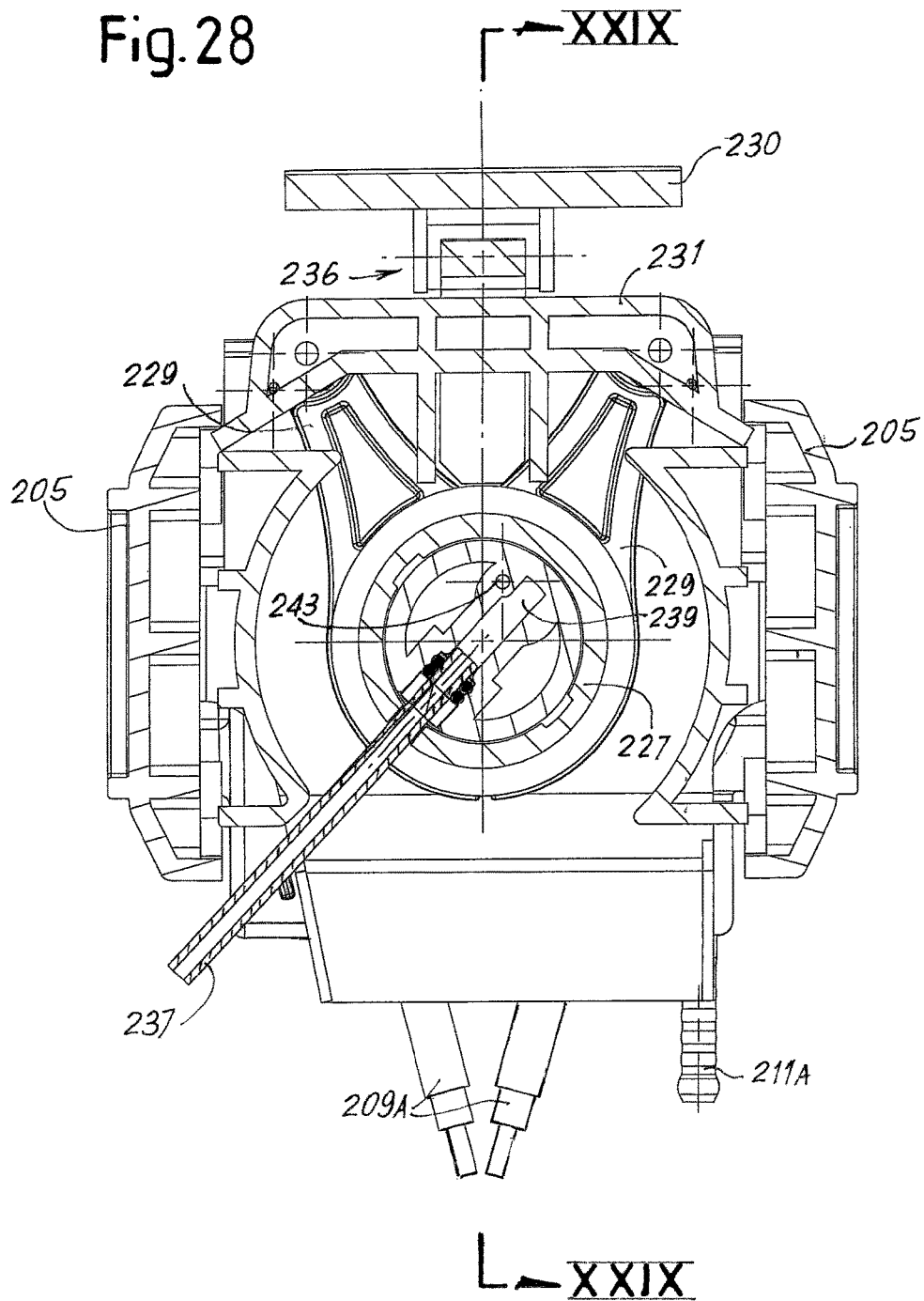

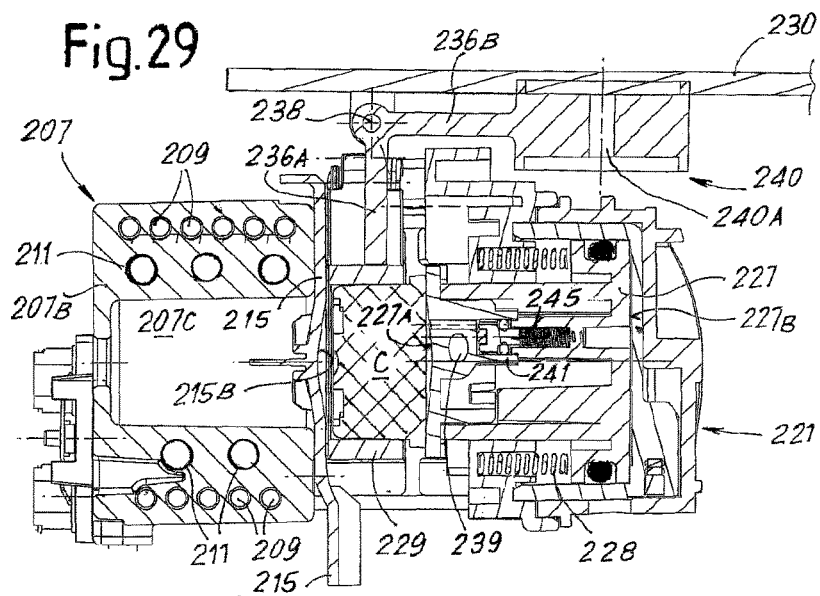
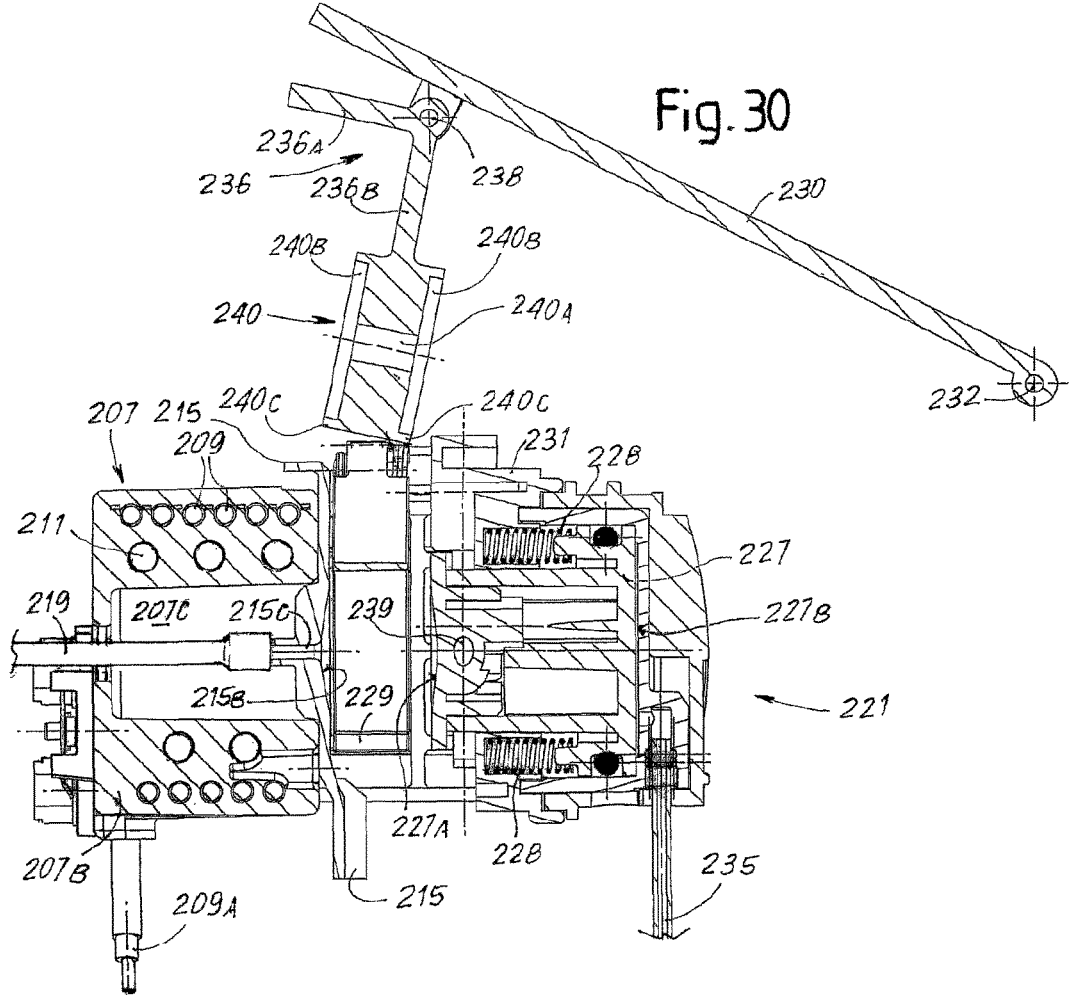

BREWING UNIT WITH A WATER HEATER

CROSS-REFERENCE TO PRIOR APPLICATIONS

This application is the U.S. National Phase application under 35 U.S.C. § 371 of International Application No. PCT/IB2012/053403, filed on Jul. 4, 2012, which claims the benefit of U.S. Provisional Patent Application No. 61/506,244, filed Jul. 11, 2011 and European Patent Application No. 11173201.2, filed on Jul. 8, 2011. These applications are hereby incorporated by reference herein.

TECHNICAL FIELD

The present invention relates to a brewing unit for producing drinks such as coffee, from loose coffee powder or single-dose packagings, such as capsules or pods.

BACKGROUND ART

For producing hot drinks, such as for example coffee, tea, vegetable-based infusions and the like, single-dose packagings, in the form of so-called capsules, pods, cartridges or the like are often used. Here after the term "capsule" will be used to broadly designate such a single-dose packaging. It shall be understood that, unless specifically indicated, said term is to be understood as encompassing any kind of single-dose packaging suitable for preparing beverages or other edible products by extraction using hot and possibly pressurized water. A single dose packaging can include sufficient ingredients to prepare more than just one portion of beverage, e.g. two portions.

Capsules usually contain the ingredients for producing the drink. Hot water is made to flow through the capsule at an adequate pressure to extract the flavours from the ingredients contained in the capsule. There are several types of devices for handling the capsules and for the infusion, that is phase of extracting the flavours from the capsules through water passage.

Some coffee machines are designed for use of loose coffee powder or other loose products. In these machines a dosed quantity of loose product is charged in a brewing chamber. The chamber is closed in a water-tight manner and hot pressurized water is fed from a water heater through the product charged in the brewing chamber, to extract flavours from the ingredients.

U.S. Pat. No. 6,129,006 and EP-A-0931491 disclose a brewing unit specifically intended for brewing coffee from bulk coffee powder. This known brewing unit includes a brewing chamber and a water heater. The water heater is arranged near to the brewing chamber.

Arranging the water heater near the brewing chamber has the advantage of reducing heat dissipation from the heated water along the path from the water heater to the brewing chamber.

One problem of these brewing units, being of the type using pre-packaged single-dose capsules, or loose ingredients, is connected with the need of providing a structure surrounding the brewing chamber which is capable of resisting high mechanical stresses generated by the pressurized water fed through the brewing chamber. For the preparation of espresso coffee, for example, water pressurized up to 8-15 bar flows through the brewing chamber. The force exerted by the water against the portions of the brewing chamber must be supported by a suitably designed frame on which the brewing chamber is mounted. This requires cumbersome structures.

SUMMARY OF THE INVENTION

The present invention relates to a brewing unit with a brewing chamber formed by at least two portions mobile one with respect to the other, which at least alleviates the above mentioned problem. The object of preferred embodiments of the invention is to provide a brewing unit which is particularly compact and simple to manufacture.

According to one aspect of the invention a brewing unit for the production of a beverage is provided, comprising: a brewing chamber comprising at least two brewing chamber portions movable one with respect to the other; a water heater; a structural frame supporting said at least two brewing chamber portions, on which forces generated by the pressurized water in the brewing chamber during brewing are discharged. The structural frame comprises two side components arranged sideways of the brewing chamber, and two end components mechanically constrained to the two side components. Moreover a first one of the end components comprises the water heater and a first one of said at least two brewing chamber portions, said first brewing chamber portion being arranged adjacent said water heater, whereby said forces generated by the pressurized water in the brewing chamber during brewing are discharged on said water heater. The first brewing chamber portion, the side components and the second end component form a closed structure to which the water heater is constrained. The first brewing chamber portion and the water heater are constrained to the two side components independently one from the other by means of separate constraining members.

Independently constrained means that the water heater can be disengaged from the side components maintaining the brewing chamber portion connected to said side components, i.e. the brewing chamber portion is not connected to the side components indirectly via the water heater.

The closed structure formed by the first brewing chamber portion, the side components and the second end component can be manufactured and assembled with reduced tolerances, so that the brewing chamber portions can operate correctly. Precise dimensioning and reduced clearances result in improved guided movement of the brewing chamber portions. Correct water-tight closure of the brewing chamber and/or waterproof sealing action against the capsule arranged in the brewing chamber is thus ensured, preventing water and/or beverage leakage during the brewing cycle.

Since the water heater is connected to the side components separately from the brewing chamber portions, the water heater does not require precise manufacturing. The water heater can be connected to the remaining components of the structural frame with a rather coarse connection. Possible clearances between the closed structure formed by the side components and the first brewing chamber portion on the one side and the water heater on the other can be taken up during brewing thanks to elastic deformations. During brewing the first brewing chamber portion is pressed by the pressurized water against the adjacent water heater. Possible clearances are taken up and the water heater contributes to maintain the brewing chamber closed against the pressure exerted therein by the pressurized brewing water. In other words, the water heater body contributes to the mechanical resistance of the structural frame of the brewing unit forming part thereof, due to the fact that the forces generated by the pressurized water in the brewing chamber are at least partly supported by the water heater body. This renders the structure more economical and efficient.

Relatively sturdy constraining members can be used to connect the water heater to the side components of the closed structure, while the brewing chamber portions can be connected to the side components by means of lighter, less expensive but sufficiently precise constraining members.

In some embodiments, the first brewing chamber portion is mounted adjacent the water heater body and in direct or indirect mechanical contact therewith. Indirect mechanical contact means that an intermediate mechanical component can be arranged between the water heater body and the brewing chamber portion, such that axial force is transmitted from the brewing chamber portion to the water heater body directly or via said intermediate mechanical component. The intermediate mechanical component can e.g. be a plate arranged between the brewing chamber portion and the water heater and between said two side components forming the closed structure supporting the brewing chamber portions.

According to some embodiments, the first brewing chamber portion is fixed with respect to the closed structure and in direct or indirect contact with the water heater. The second brewing chamber portion is movable with respect to said closed structure. The second brewing chamber portion is moved towards the first brewing chamber portion to selectively close and open the brewing chamber, the two brewing chamber portions being connected to one another by the closed structure, independently of the water heater.

Further advantageous embodiments of the invention are set forth in the dependent claims.

In some embodiments the water heater comprises a main body and protrusions engaging into seats provided in side components of the structural frame. This provides a simple though efficient and sturdy connection between the side components and the water heater, capable of withstanding high pressure inside the brewing chamber.

In some embodiments the side components of the structural frame form guides for slidingly engage the movable brewing chamber portion. This reduces the number of components forming the brewing unit, since the same side components perform different functions.

The invention further concerns a beverage producing machine including a brewing unit as above defined.

Within the context of the present description and enclosed claims, the term "brewing chamber" shall not be necessarily understood as being a sealingly closed chamber. Rather, as will become clear from the detailed description of some exemplary embodiments of the invention, the brewing chamber can also be formed by chamber portions which define a volume in which a capsule or cartridge is arranged and which is not per se sealed. The brewing chamber portions in this case retain the capsule and prevent bursting of the capsule when pressurized water flows through the capsule. However, the chamber portions surround the capsule without necessarily providing a waterproof seal around the capsule.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 1A and 1B show a perspective view of the brewing unit according to a first embodiment in open and closed position, respectively;

FIG. 2 shows a plan view of the brewing unit of FIG. 1 in an open position during insertion of a capsule;

FIG. 3 shows a side view according to line III-III in FIG. 2;

FIGS. 8 and 9 show cross sections according to lines VIII-VIII and IX-IX in FIG. 6;

FIGS. 10 and 11 show a plan view and a side view according to line XI-XI in FIG. 10, respectively, of the brewing unit during closure of the brewing chamber;

FIGS. 20 and 21 show cross sections according to lines XX-XX and XXI-XXI of FIG. 18, respectively;

FIG. 23 shows a perspective view of a brewing unit according to the invention in a second embodiment;

FIG. 24 shows a perspective view of the brewing unit of FIG. 23 with the water heater removed;

FIG. 26 shows a longitudinal cross-section of the brewing unit according to FIGS. 23 to 25 with the brewing chamber in the open position;

FIG. 27 shows a longitudinal cross-section of the brewing unit of FIGS. 23 to 26 with the brewing chamber in the closed position and a capsule ready for brewing;

FIG. 28 shows a transverse cross-section according to line XXVIII-XXVIII in FIG. 27;

FIG. 29 shows a transverse cross-section according to line XXIX-XXIX in FIG. 28;

FIG. 30 shows a longitudinal cross-section of the brewing unit according to FIGS. 23 to 29, before a washing or de-scaling cycle;

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Hereinafter reference will specifically be made to brewing units using pre-packaged capsules for the preparation of coffee beverages. However it should be understood that the invention can be embodied also in brewing units using loose ingredients, such as coffee powder, as well as to units for the preparation of different kinds of edible products by means of extraction with hot pressurized water.

Embodiment of FIGS. 1-22

Figure 4:
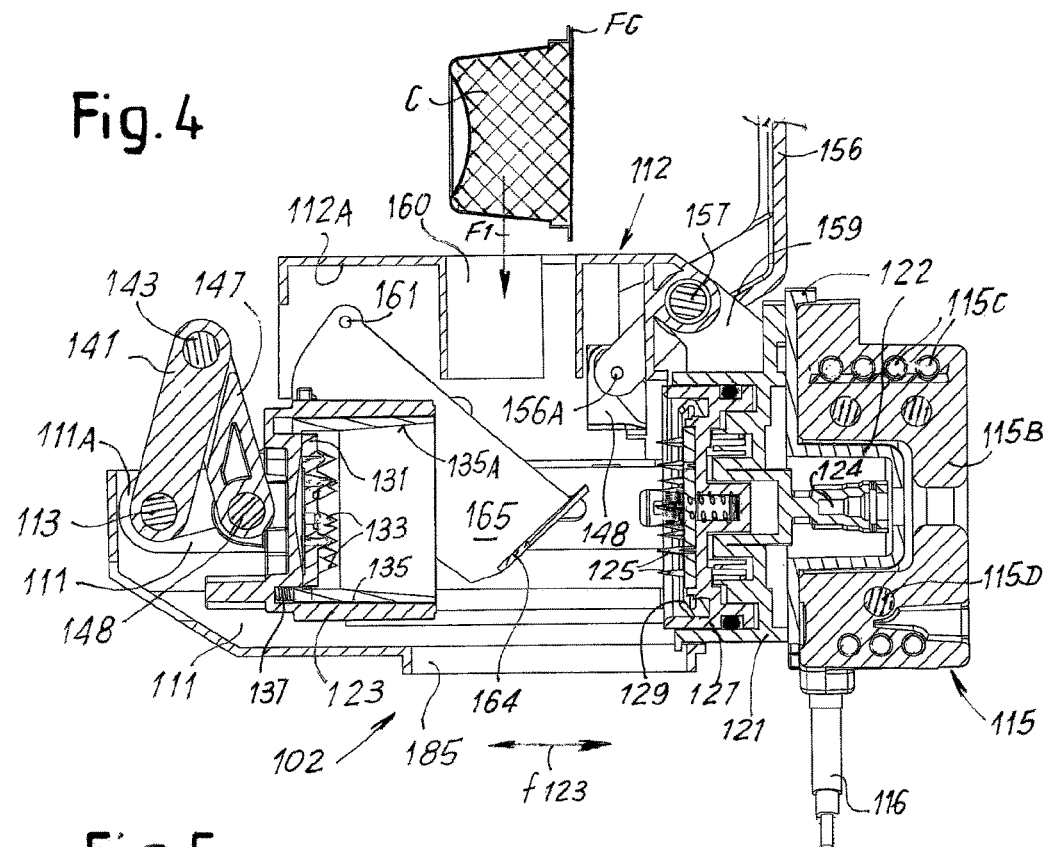
FIGS. 4 and 5 show cross sections according to lines IV-IV and V-V in FIG. 2.
Figure 5:
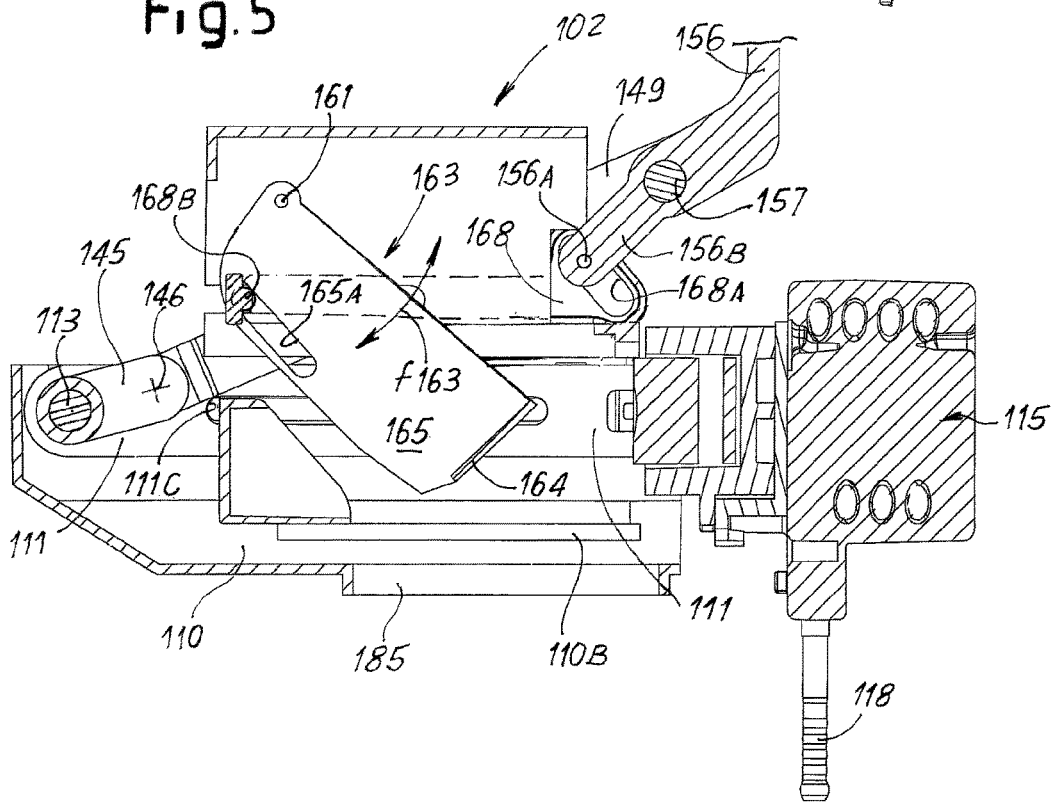
Figure 6:
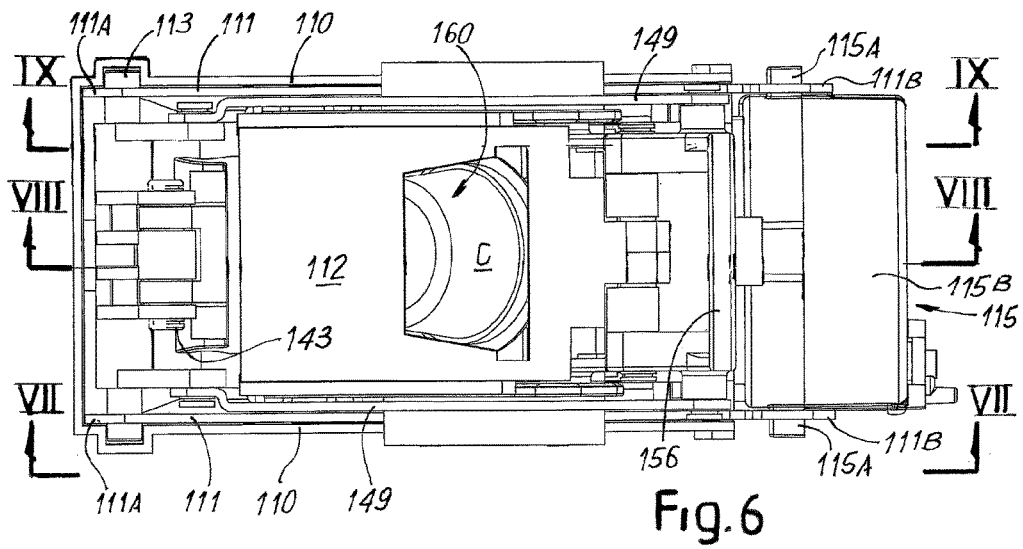
FIGS. 6 and 7 show a plan view and a side view according to line VII-VII in FIG. 6, respectively, of the brewing unit before closure of the brewing chamber.
Figure 7:
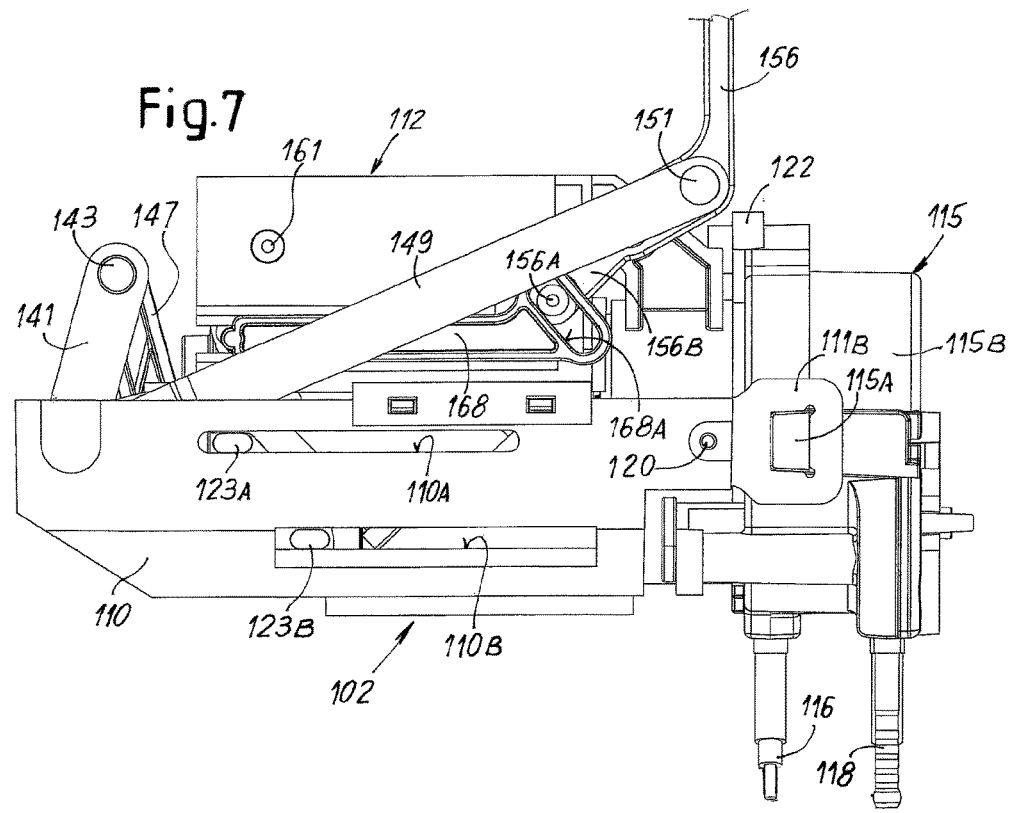
Figure 12:
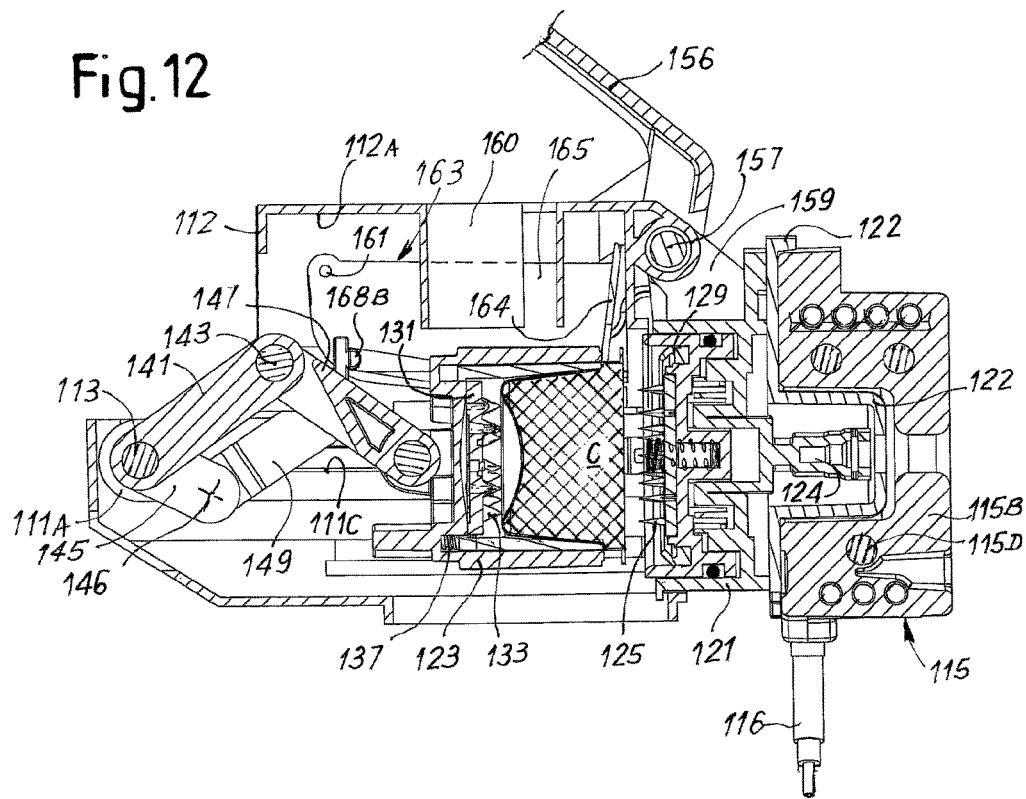
FIGS. 12 and 13 show cross sections according to lines XII-XII and XIII-XIII in FIG. 10.
Figure 13:
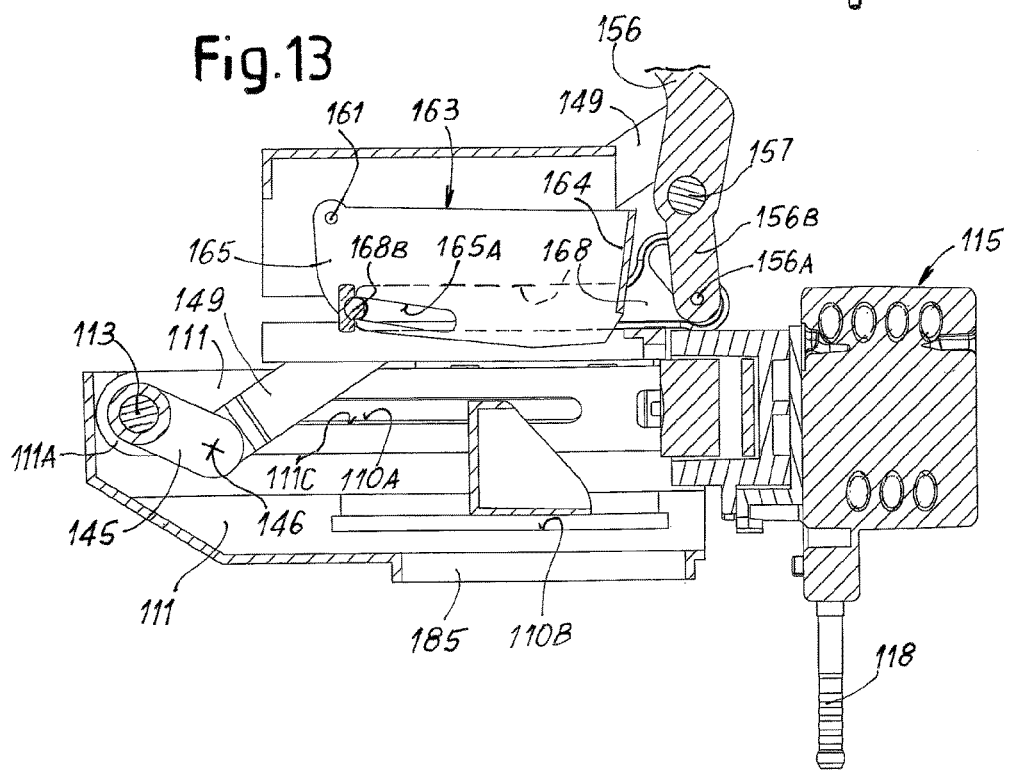
Figure 14:
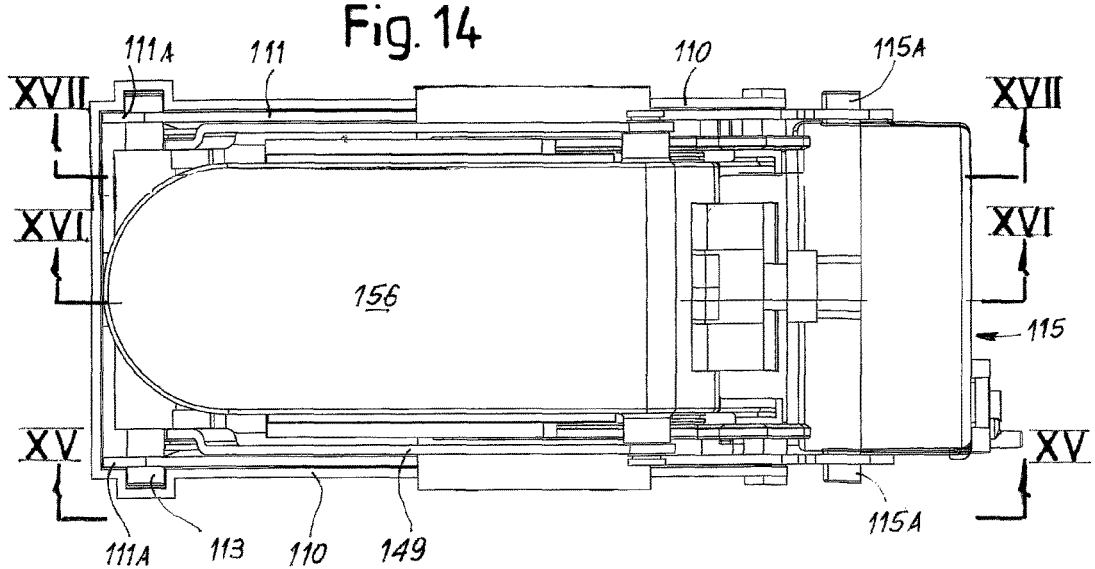
FIGS. 14 and 15 show a plan view and a side view according to line XV-XV in FIG. 14, respectively, of the brewing unit in the brewing position.
Figure 15:
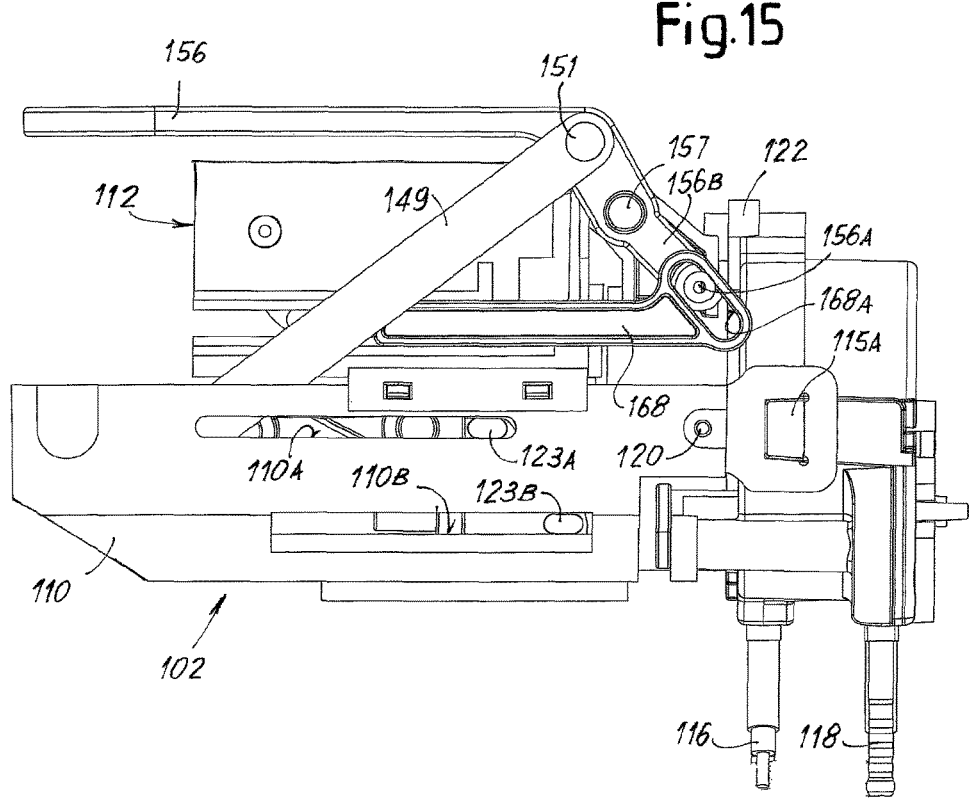
Figure 16:
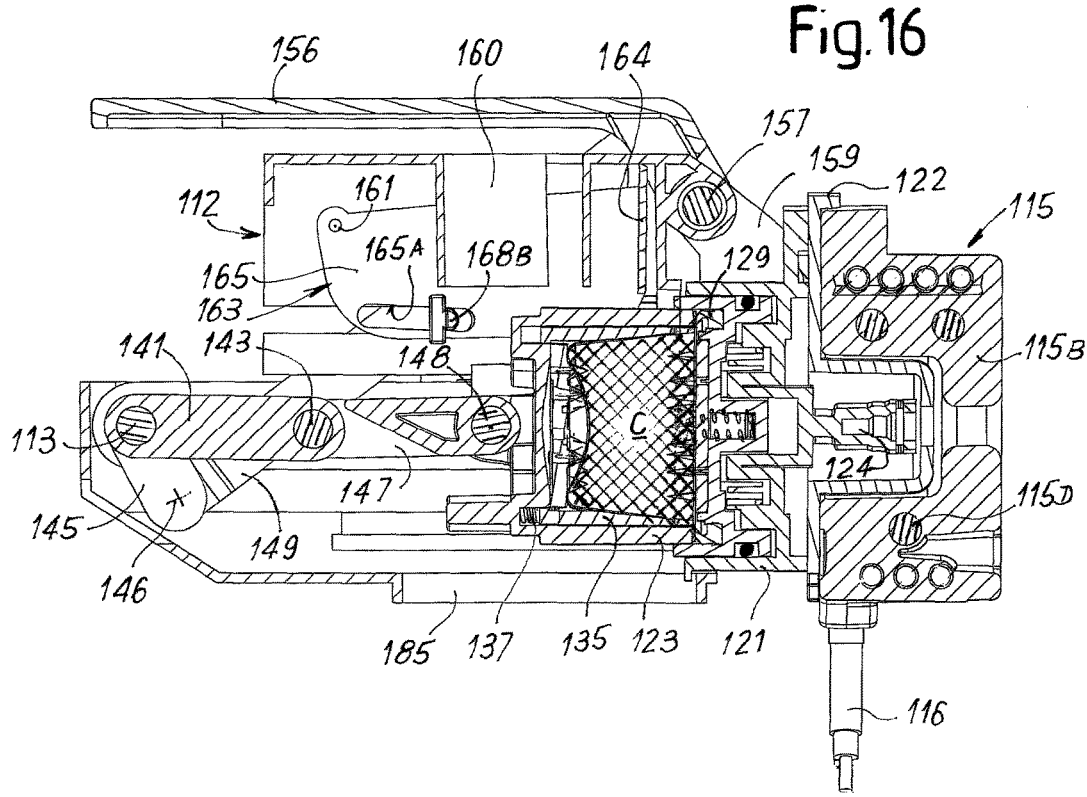
FIGS. 16 and 17 show cross sections according to lines XVI-XVI and XVII-XVII in FIG. 14.
Figure 17:
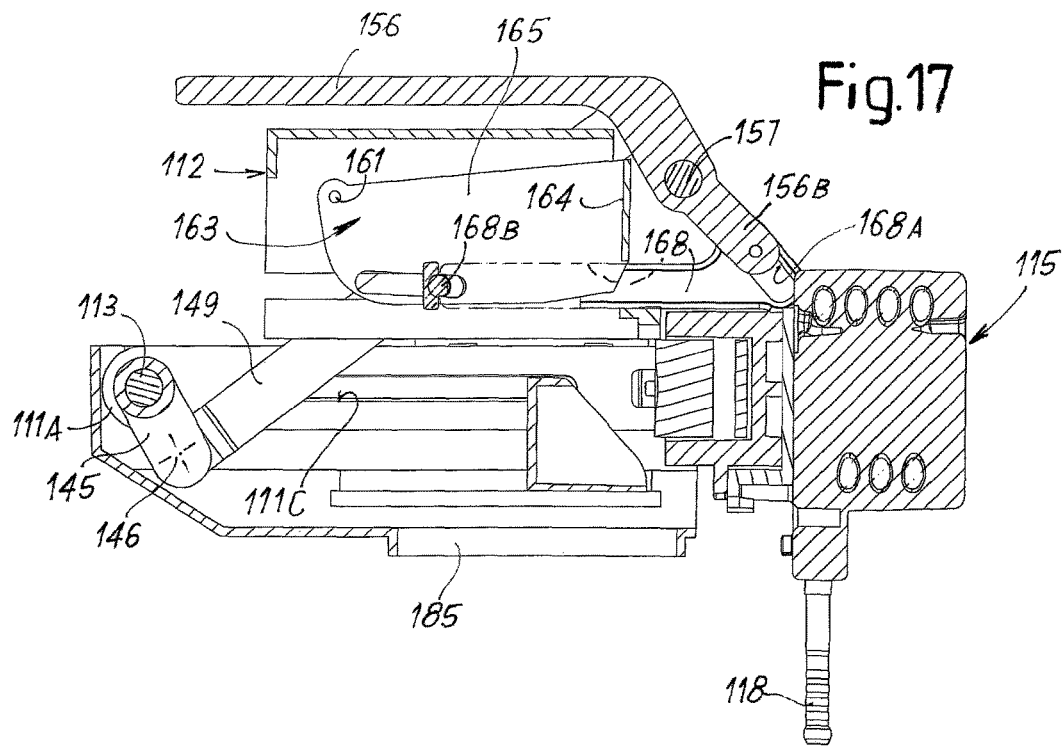
Figure 18:
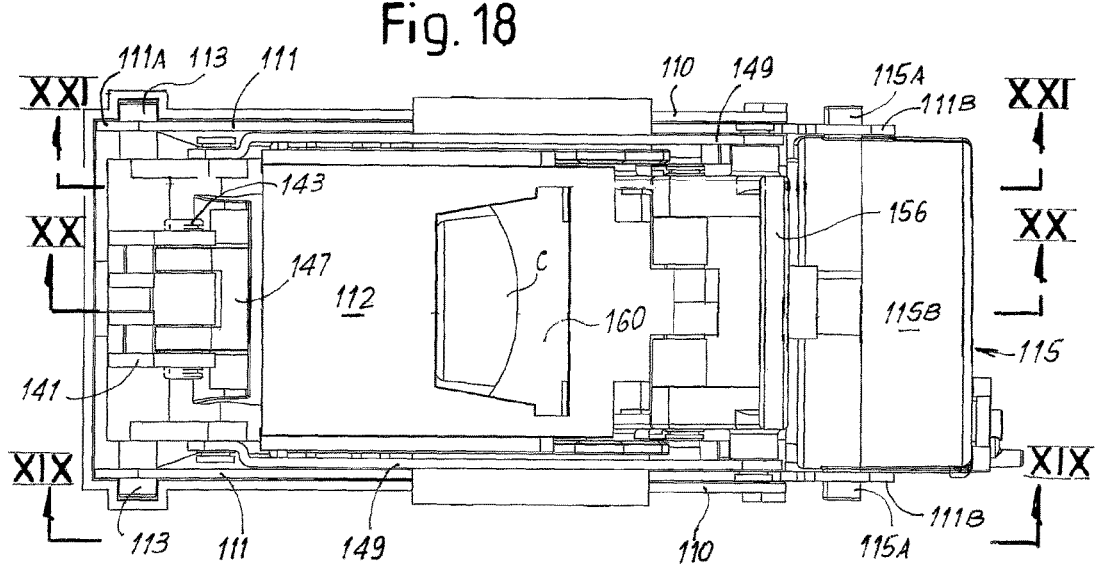
FIGS. 18 and 19 show a plan view and a side view according to line XIX-XIX in FIG. 18, respectively, of the brewing unit during opening of the brewing chamber and discharge of the spent capsule.
Figure 19:
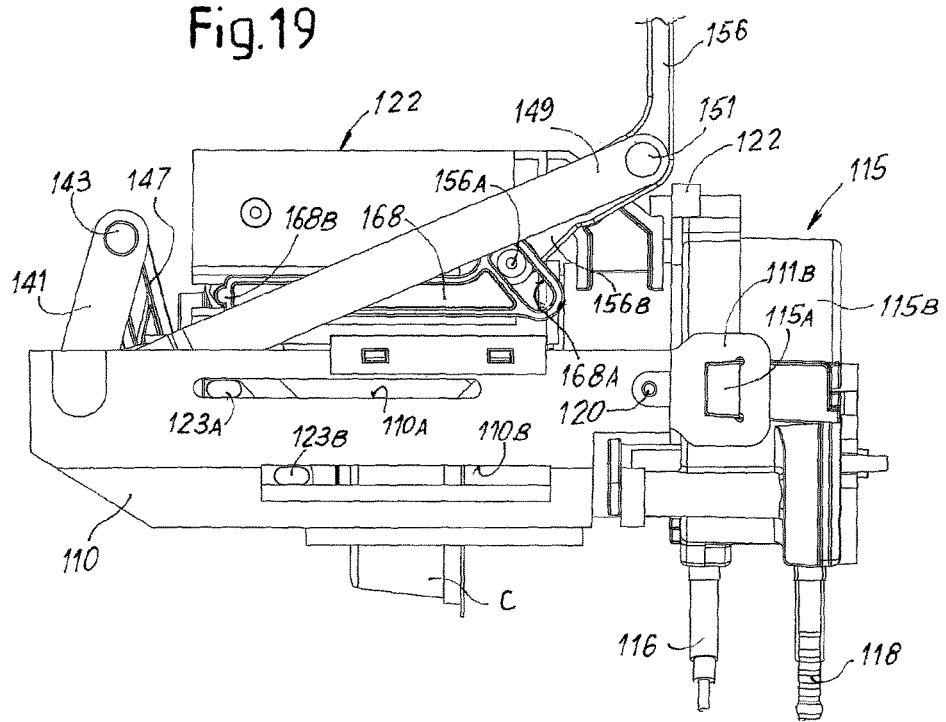
Figure 22:
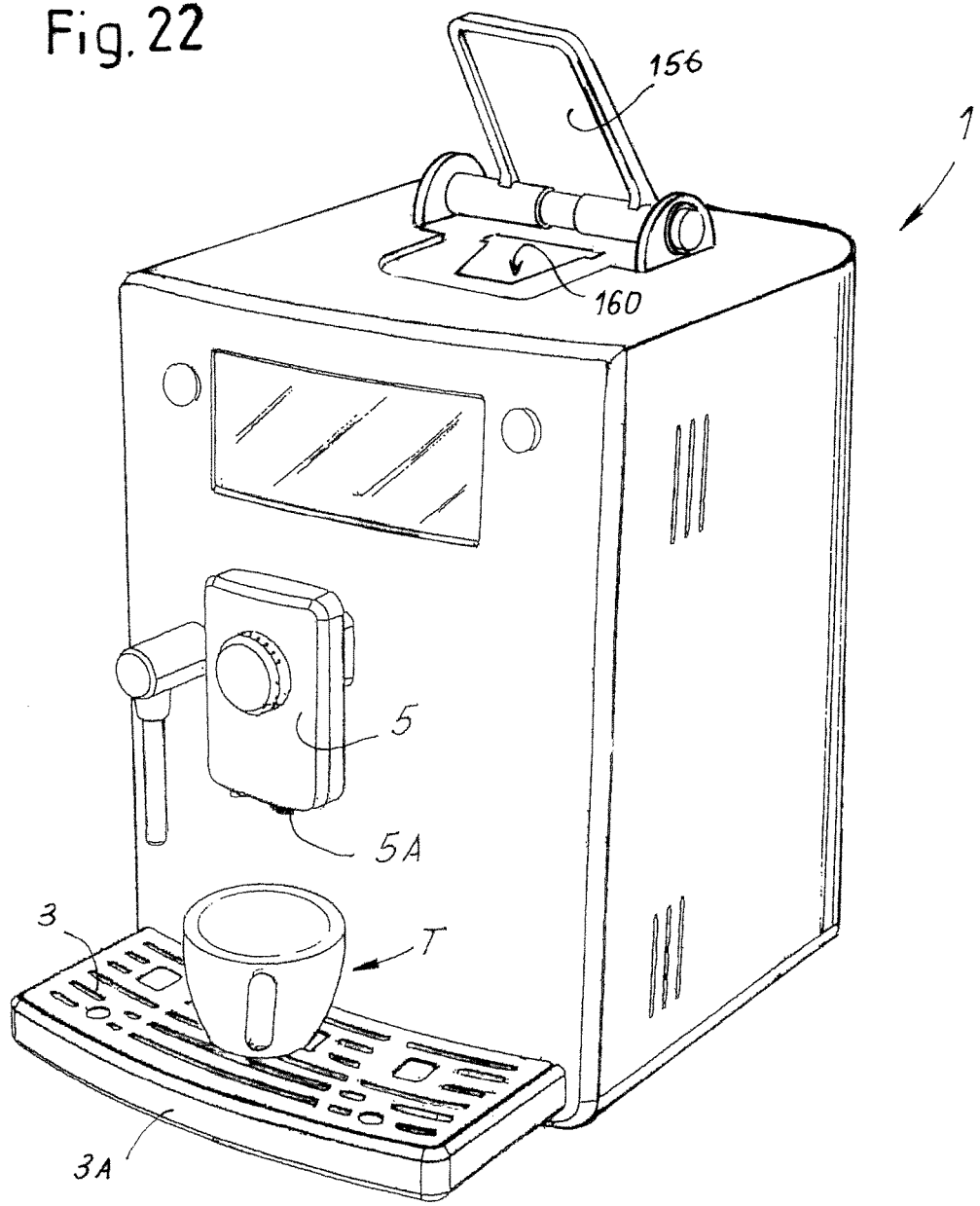
FIG. 22 shows a perspective view of a coffee machine including a brewing unit according to the invention.

FIG. 22 shows generically a manually operated coffee machine for use with capsules, including a brewing unit, which will be described hereinafter referring to FIGS. 1 to 21. The machine 1 comprises a grid 3 on which one or two cups T can be placed, under a coffee spout 5 provided with two nozzles 5A from which the drink produced by the brewing unit 2 is supplied. A drip tray 3A is arranged under the grid 3.

In some embodiments, the brewing unit (FIGS. 1-21), labelled 102 as a whole, comprises a fixed shell 110 and a block 112 arranged on top of said fixed shell 110 and constrained thereto. The shell 110 and the block 112 are mounted in a fixed position inside the machine 1. The shell 110 encloses a structural frame to which two portions of a brewing chamber are constrained. The structural frame surrounds the brewing chamber and the forces generated inside the brewing chamber during the brewing process are discharged on said structural frame.

More specifically, in some embodiments the structural frame comprises two lateral tie rods 111. In some embodiments each tie rod is made of a sheet of metal or other suitable material. The tie rods 111 form structural components of the structural frame supporting the brewing chamber, i.e. components on which stresses generated by the brewing pressure are applied.

First ends 111A of the two tie rods 111 are connected to one another by a transverse shaft 113. The opposite second ends 111B of the tie rods 111 are shaped such as to form a connector member for connection to a water heater 115. In some embodiments the ends 111B of the tie rods are provided with a through hole, for example square in shape. The edge of the through holes can be shaped such as to provide a mechanical connection by means of mechanical interference with corresponding protrusions 115A provided on the outer surface of the water heater 115. In other embodiments, different constraining members can be provided, e.g. screws or the like.

The two tie rods 111, the shaft 113 and the water heater 115 structurally cooperate with one another and form said structural frame which supports the forces generated in the brewing chamber during brewing. The water heater 115 forms therefore a structural component of said frame.

In some embodiments the water heater 115 comprises a main body 115B, e.g. formed by a block made of metal, e.g. aluminum or an aluminum-based alloy or other heat-conductive material. The protrusions 115A are preferably formed on the outer side surface of the main body 115B. In some embodiments, the block forming the main body of the water hater 114 made by pressure die-casting. The protrusions 115A can be formed integrally with the main body 115B during die-casting thereof.

In some embodiments, the main body 115B encloses an electric resistor 115C and a water duct 115D. Both the electric resistor 115C and the water duct 115D can be helically wound around an axis of the body 115B of the water heater 115. The connectors of the electric resistor 115D to a power line are labelled 116, and a water connection to a water pump delivering water to the water heater 115 is shown at 118.

A water heater of this kind is usually called instant or flow-through water heater, i.e. one in which a very small amount of water is contained in the helically shaped water duct 115D and wherein the electric resistor 115C is sufficiently powerful to heat the water while it flows through the water heater 115 during use. A different water heater can be used instead, such as a boiler with an accumulation vessel, in which a larger amount of hot water is maintained at the required temperature by a smaller resistor. What is important is only that the water heater forms a structural component of the frame supporting the brewing chamber. Though, a flow-through water heater offers better mechanical resistance in addition to other advantages in terms of power consumption.

In some embodiments the brewing chamber comprises two portions. In the embodiment shown the brewing chamber includes a first brewing chamber portion 121 and a second brewing chamber portion 123. In some embodiments the first brewing chamber portion 121 is mounted fixed with respect to the frame formed by the tie rods 111, the shaft 113 and the boiler 115. Preferably the first brewing chamber portion 121 is attached to the water heater 115, adjacent thereto, or in heat-contact with the body thereof. The first brewing chamber portion 121 is constrained to the tie rods 111 by constraining members. In the embodiment illustrated in the figures, said means comprise rivets, pins, screws or the like, schematically shown at 120. In this way the two brewing chamber portions 121, 123 are connected to one another by the tie rods 111 arranged sideways of the brewing chamber. The tie rods, the transverse shaft 113, and the brewing chamber portion 121 form a closed structure surrounding the brewing chamber portion itself. The first brewing chamber portion 121 and the transverse shaft 113 form part of two end components of the closed structure. The tie rods are transversely connected to one another by means of said transverse shaft 113 and by the first brewing chamber portion 121.

As mentioned above, the water heater 115 is in turn engaged to the tie rods 111. The connection of the tie rods 111 to the water heater 115 is independent of the connection of the brewing chamber portions 121, 123 to said tie rods, i.e. different constraining members are used to connect the brewing chamber portion on the one side and the water heater on the other to the tie rods 111.

In the embodiment illustrated in the drawings, the brewing chamber portion 121 is directly connected to the tie rods 111 by screws, rivets or the like 120, while the water heater 115 is connected to the tie rods 111 through the protrusions 115A, independently of the brewing chamber portion 121.

A certain degree of clearance or backlash due to manufacturing tolerances can exist between the water heater 115 and the tie rods 111 and/or the brewing chamber. This clearance or backlash does not negatively affect the operation of the brewing unit, especially the correct closure of the brewing chamber, since the reciprocal position of the two brewing chamber portions 121, 123 is correctly defined by the closed structure formed by the tie rods 111, the brewing chamber portions 121, 123, the transverse shaft 113 and the connection formed therebetween.

However, when the brewing chamber 121, 123 is closed and pressurized water is fed to the brewing chamber, the axial force generated by the water pressure is discharged on the water heater 115. In this way the body of the water heater supports the stress generated by the water pressure in the brewing chamber during the brewing cycle and cooperates with the tie rods 111 and the transverse shaft 113 in maintaining the brewing chamber in the closed position. Possible clearances are taken up during the brewing cycle thanks to axial deformation of the tie rods 111.

In the embodiment shown in the drawings the first brewing chamber portion 121 is connected to or in contact with the water heater 115 with the interposition of an intermediate shaped plate 122. The water heater 115 is thus in heat contact with the brewing chamber portion 121 through said intermediate shaped plate 122. Heat contact means that heat can be transmitted from the water boiler main body 115B to the brewing chamber portion 121 by conduction, such that the water heater 115 can keep the brewing chamber portion 121 at a temperature higher than the ambient temperature due to heat conduction.

The second brewing chamber portion 123 is movable with respect to the first brewing chamber portion 121 according to the double arrow f123 along a direction substantially parallel to the axis of the brewing chamber, labelled A-A in the drawings.

In some embodiments, at least one of said brewing chamber portions or both said brewing chamber portions are provided with perforation means to perforate a capsule C containing the ingredients for the preparation of the coffee beverage. In the embodiment shown in the drawings the fixed brewing chamber portion 121 is provided with perforators 125 extending through holes provided in a disc member 127 slidably arranged in the fixed brewing chamber portion 121. The disc member 127 is provided with a sealing ring 129 co-acting with an annular edge of the opposite movable brewing chamber portion 123. When the brewing chamber is closed and the brewing cycle starts, hot water flowing from the water heater 115 enters the brewing chamber through a duct 124, flows through the holes provided in the disk member 127 and enters the capsule C through apertures punched in the top surface of the capsule by the perforators 125.

When the brewing chamber opens after a brewing cycle has been completed, springs (not shown) push the disc member 127 away from the bottom of the housing formed by the outer substantially cylindrical wall of the fixed brewing chamber portion 121, such as to function as an extractor of the capsule C after brewing has taken place.

As can be seen in the drawings, the fixed brewing chamber portion 121 is arranged just adjacent the water heater 115, such that the path the water has to travel from the water heater 115 to the interior of the brewing chamber is extremely short and substantially no heat is wasted. Also the beverage dispensed during the first brewing cycle following a period of standby of the machine is sufficiently hot, since substantially no cold water remains between the water heater 115 and the brewing chamber.

The movable brewing chamber portion 123 is cup-shaped and near the bottom thereof a plate 131 can arranged, which is advantageously provided with perforating protrusions 133. In some embodiments, the protrusions 133 are apertured such that the beverage extracted from the ingredients contained in the brewing chamber exits the brewing chamber through passages extending along the protrusions 133.

A substantially cylindrical hollow member 135 can be housed inside the recess of the movable chamber portion 123. The cylindrical hollow member 135 is provided with an inner wall 135A which can have a shape corresponding to the shape of the outer side surface of the capsule C, in the illustrated example an approximately truncated conical shape. The hollow member 135 is elastically biased by a spring 137 arranged between the cylindrical hollow member and the bottom of the movable brewing chamber portion 123. Said cylindrical hollow member 135 acts as an ejector to eject the capsule C from the inside of the movable brewing chamber portion 123 after brewing. In the drawings, for the sake of simplicity, the spring 137 is always shown in its compressed condition, even when the brewing unit is open.

Two perforator means to perforate the bottom surface and the top surface of a capsule C as described herein, allow using sealed capsules, made of plastic, metallic sheet or other suitable material. The possibility of omitting one or the other, or both perforator means, is not excluded, for example when capsules are used which open by the effect of the water pressure outside and/or of the drink pressure inside the capsule or when capsules are used which have one or both opposed faces provided with a water-permeable area, for example closed with a non woven cloth or a filter made of paper or other material permeable to liquids.

While the fixed brewing chamber portion 121 is fixedly in contact with the water heater 115 and supported by the tie rods 111, the movable portion 123 of the brewing chamber is slidingly supported within the frame formed by the water heater 115, the first brewing chamber portion 121, the tie rods 111 and the transverse shaft 113. More specifically, in the example shown the movable portion 123 of the brewing chamber is provided with two pairs of laterally projecting pins 123A, 123B. The pins 123A are slidingly engaged into slots 110A of the outer shell 110 and in corresponding slots 111C of the two oppositely arranged tie rods 111, while the pins 123B are slidingly engaged in slots 110B of the outer shell 110. A different guiding mechanism for slidingly guiding the brewing chamber portion with respect to the frame can be envisaged, e.g. a single pair of pins having an elongated cross-section.

A suitable manual or servo-actuator is provided for controlling the movement of the movable brewing chamber portion 123. In the example shown in the drawings, the movement of the movable brewing chamber portion 123 is controlled by a crank 141 pivoted at 143 to a corresponding pair of rods 147. The rods are in turn hinged at 148 to the movable brewing chamber portion 123. The crank 141 is hinged about the shaft 113 and is integral with appendages 145. Said appendages are in turn hinged at 146 to tie rods 149 hinged at 151 to a control lever 156. The control lever 156 is in turn pivotally engaged at 157 to a protrusion 159 solid to the fixed brewing chamber portion 121 or to any other part rigidly connected to the frame surrounding the brewing chamber.

The rotation of the control lever 156 about the hinge 157 according to double arrow f156 causes the rotation of the crank 141 about the shaft 113. The rotary motion of the crank 141 is transformed by the crank-rod connection 141-147 into a translation motion of the movable brewing chamber portion 123.

Other kinds of actuating mechanisms can be used to control the closing and opening movement of the brewing chamber. For example an electric motor or a hydraulic or pneumatic actuator can be used, which acts for example on a shaft controlling the movement of the crank 141.

According to the embodiment shown in FIGS. 1 to 21 the capsule C is introduced into the brewing chamber by gravity. For that purpose, an aperture 160 is provided on a top surface 112A of the block 112. The capsule is caused to fall according to arrow F1 (FIG. 4) through the aperture 160.

When the brewing chamber is in its open position (FIGS. 2-5) a mobile deviating member 163, hinged by means of a pin 161 to the upper block 112, is arranged underneath said aperture 160.

The mobile deviating member 163 can be comprised of a wall or chute 164 supported by oscillating arms 165. The pivoting pin 161 is parallel to the shaft 113 and to the pivoting axes of the transmission members 156, 149, 147, 141 described above and orthogonal to the direction f123 of the closing and opening motion of the brewing chamber.

As will be explained in more detail hereinafter, the mobile deviator 163 aims at guiding and deviating a capsule C towards the inside of the mobile brewing chamber portion 123 and to favour the discharge, i.e. the ejection of the exhausted capsule C after brewing.

The rotation motion according to the double arrow f163 of the mobile deviator 163 around the pin 161 can be imparted preferably by the lever 156. In the illustrated embodiment, this motion is obtained by means of a kinematic connecting member between the control lever 156 and the mobile deviator 163. In the illustrated embodiment the kinematic connection member comprises a pair of sliders 168, each provided with a slotted cam profile 168A into which corresponding pins 156A engage, said pins 156A being arranged at the ends of projections 156B integral to the lever 156. Rotation of the lever 156 causes therefore a sliding motion of the sliders 168. Each slider 168 has an end projection 168B opposite the respective slotted cam profile 168A. Each end projection 168B engages into a slit 165A of the corresponding arm 165 of the mobile deviator 163. With this arrangement, the reciprocating motion of the sliders 168 imparts a pivoting motion to the mobile deviator 163. The lever 156, therefore, controls in a synchronized manner the pivoting movement of the mobile deviator 163 and the translation movement of the brewing chamber portion 123.

The operation of the brewing unit described so far is as follows. In FIGS. 2 to 5 the brewing unit 102 is open. The aperture 160 can be accessed by the user from the upper portion of the machine. The user can insert a capsule C inside the insertion aperture 160. The capsule C falls by gravity into the brewing unit 102, reaching the position shown in particular in the section of FIG. 8. The capsule C meets the chute 164 supported by the pivoting arms 165 and is stopped.

At this stage the mobile deviator 163 is in such a position that the capsule C, by meeting the chute 164, is deviated with the bottom thereof towards the brewing recess formed in the interior of the mobile brewing chamber portion 123, as shown in FIG. 8. Before closing the brewing unit 102 by actuating the lever 156, the capsule C is retained in this position by resting with the top surface thereof against the chute 164 of the mobile deviator 163 and with the side wall thereof against the edge of the mobile brewing chamber portion 123.

By moving the control lever 156 downwards the brewing chamber is closed. FIGS. 10 to 13 show the brewing chamber 121, 123 approaching its closed position, while FIGS. 14-17 show the brewing unit with the brewing chamber in the closed position ready to start the brewing cycle. During the closing motion the mobile deviator 163 is gradually lifted and clears the area where the mobile brewing chamber portion 123 moves while approaching the fixed brewing chamber portion 121. The lifting pivoting motion around the pin 161 is controlled by the sliders 168 engaging the mobile deviator 163 at projections 168B, acting as followers in the slits 165A, which act as cam profiles.

In the closed position (FIGS. 14-17) the flange F of the capsule C is sealingly engaged between the edge of the mobile brewing chamber portion 123 and the seal 129 of the fixed brewing chamber portion 121. The projections of the perforators 125 and 133 penetrate respectively in the front surface and in the bottom surface of the capsule C allowing hot pressurized water to flow through the capsule and the ingredients contained therein to extract the flavours for the production of the beverage.

Once the brewing cycle has ended, a reverse rotary motion of the control lever 156 opens the brewing chamber 121, 123 as shown in FIGS. 18-21. The mobile deviator 163 is pushed downwards by the sliders 168 such that the chute 164 of the mobile deviator 163 pushes against the capsule C. The latter is ejected or at least partially taken off from the recess of the mobile brewing chamber portion 123 by the elastic thrust exerted by the spring 137 on the hollow member 135, thus avoiding that the capsule C remains inside the mobile brewing chamber portion 123. The push exerted on the upper side on the capsule C by the mobile deviator 163 avoids that the capsule C can remain adhering to the fixed brewing chamber portion 121. The exhausted capsule C is thus reliably discharged by gravity. The exhausted capsule C passes through an opening 185 provided in the outer shell 111 and is discharged in a collecting department from which it is then removed by the user.

Embodiment of FIGS. 23-32

A second embodiment of the invention is shown in FIGS. 23-32. The brewing unit is designated 202 as a whole and can be arranged in the coffee machine shown in FIG. 22.

Figure 25:
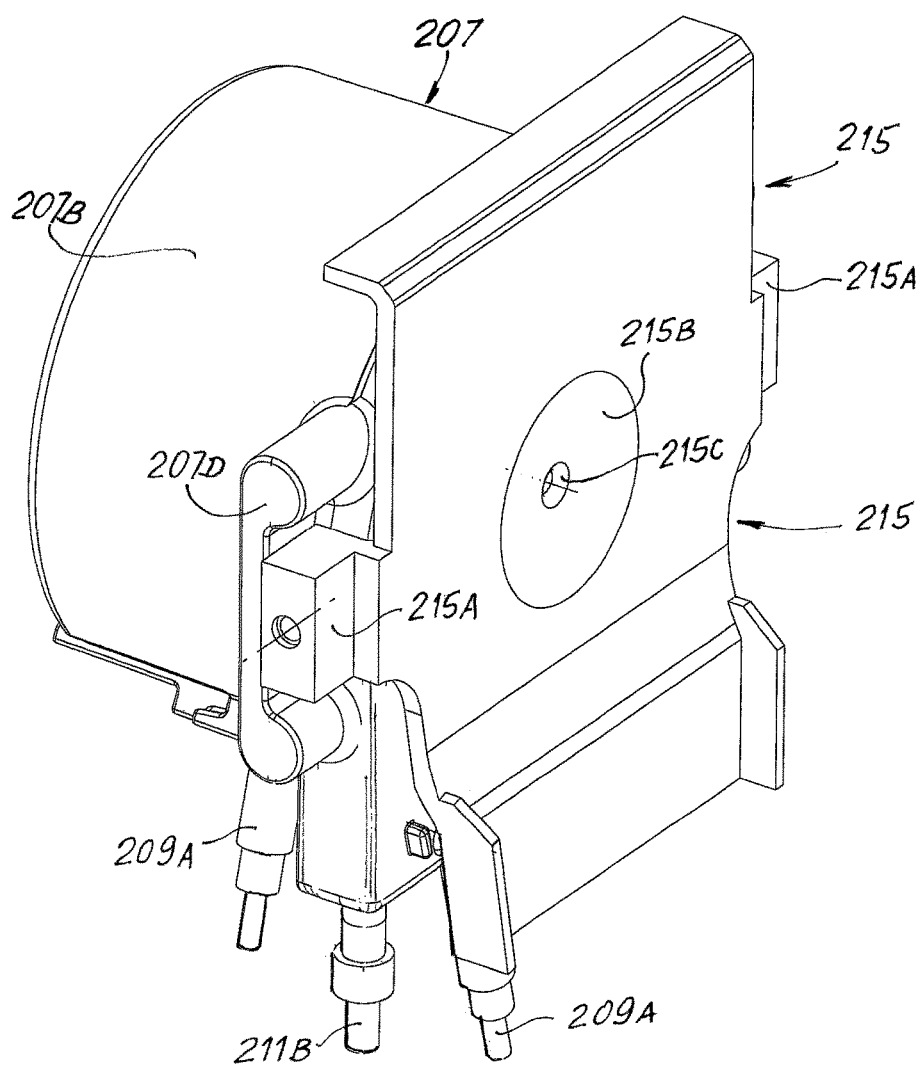
FIG. 25 shows a perspective view of the water heater removed from the brewing unit of FIGS. 23 and 24.
Figure 31:
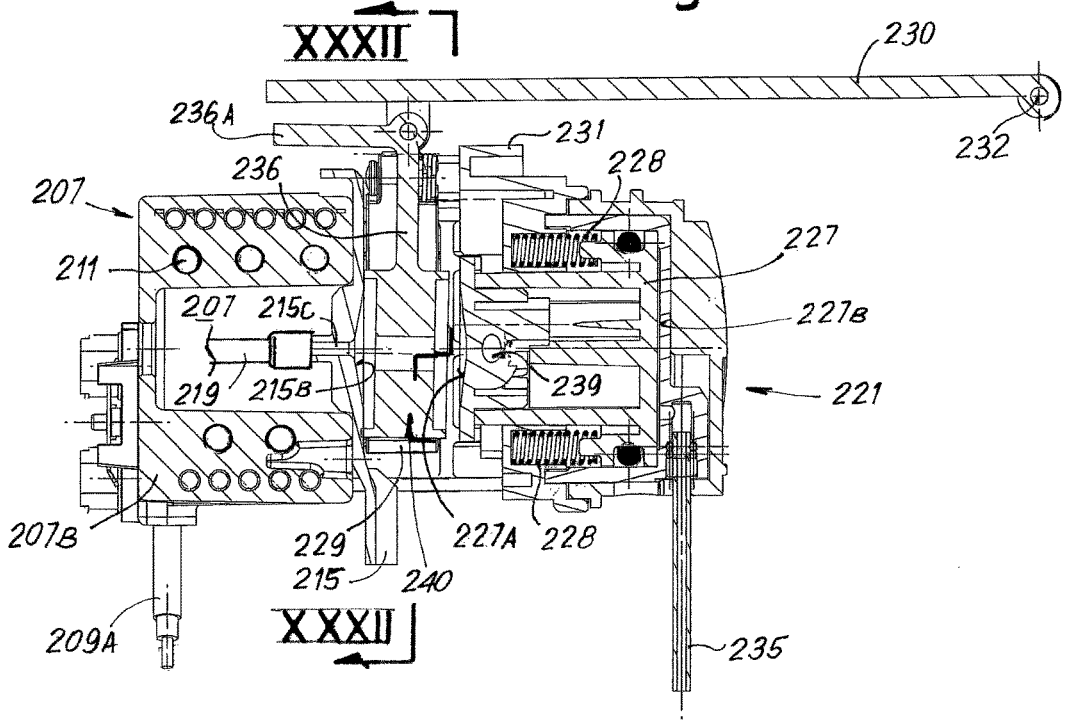
FIG. 31 shows a longitudinal cross-section of the brewing unit according to FIGS. 23 to 30 during a washing or de-scaling cycle.
Figure 32:
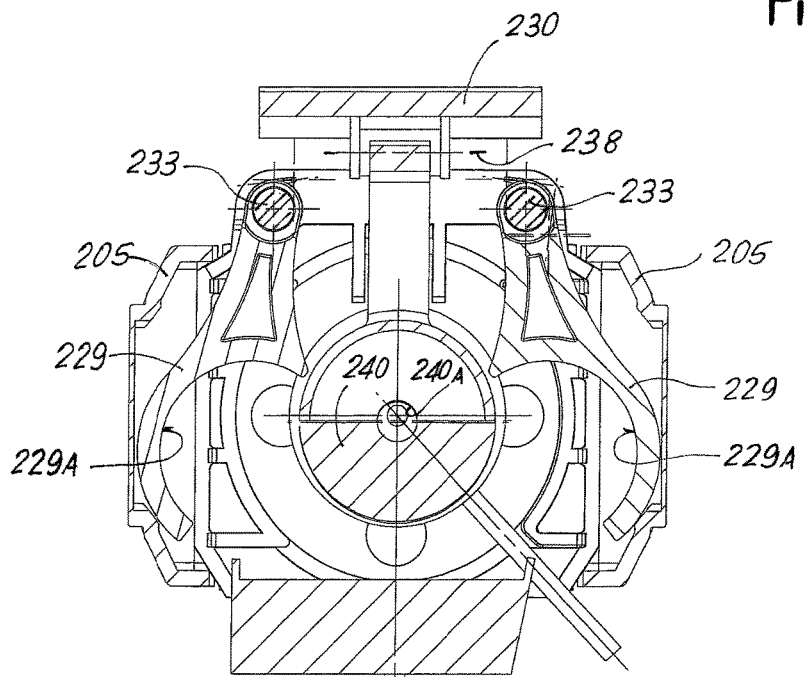
FIG. 32 shows a transverse cross-section according to line XXXII-XXXII in FIG. 31.

Referring e.g. to FIGS. 23 to 25, the brewing chamber is housed between two side panels 205 connected to one another to form a closed structural frame which supports the forces generated by the pressurized brewing water during the brewing cycle. At one end the side panels 205 are connected to one another by a water heater 207.

In some embodiments the water heater 207 is an instant or flow-through water heater. The water heater 207 can comprise (see in particular FIG. 26) a main body 207B made for example of aluminum, an aluminum alloy or another suitable, heat-conductive material. The main body 207B houses a preferably helically wound electric resistor 209 provided with connectors 209A for connection to a power source, not shown. Within the main body 207B a preferably helically wound water duct 211 is also arranged, through which the brewing water is pumped. A cold water inlet is shown at +A and a hot water outlet is shown at 211B. The main body 207B has an inner cavity 207C through which a coffee dispensing duct extends, as will be described later on.

On the outer surface the main body 207B of the water heater 207 is provided with two opposite projections 207D extending orthogonally to the axis of the main body 207B. The two projections 207D can be integrally formed with the body 207B, e.g. by die casting. The two projections 207B form engagement members for connecting the water heater 207 to the two plates 205. The projections 207B can be constrained in seats 213 formed in the side panels 205. A plate 215 can be connected to the side panels 205 by means of screws 217 engaging in threaded holes formed in protrusions 215A of said plate 215. In some embodiments, the plate 215 forms centrally a first portion of a brewing chamber shown at 215B. The central portion 215B of the plate 215 can be funnel-shaped and centrally provided with an exit hole 215C, from which the coffee beverage is dispensed into a dispensing duct 219 extending through the cavity 207C of the water heater 207. The plate 215 is in mechanical contact with the main body 207B of the water heater 207, such that the water heater 207 is actually in thermal contact with the portion of the brewing chamber formed by said plate 215. Heat conduction from the main body 207B of the water heater 207 to the plate 215 keeps at least a portion of the brewing chamber at a temperature higher than ambient temperature.

Opposite the water heater 207 an opposing closure member is provided. In the embodiment shown, a hydraulic device 221 is provided. The hydraulic device 221 comprises an outer cylinder 225 engaged by means of said screws 223 to the side panels 205. Thus, the water heater 207, the cylinder 225 of the hydraulic device 221 and the side panels 205 form a structural frame encircling the brewing chamber.

The brewing chamber is formed by the central portion 215B of the plate 215, by a piston 227 forming part of the hydraulic device 221 and by pivoting brackets 229 pivotally engaged to a block 231 constrained to the hydraulic device 221. Pivot pins 233 connect the brackets 229 to the block 231. Helical springs 234 mounted around pivot pins 233 resiliently bias the two brackets 229 in a closed position. In said closed position the distal ends of the brackets 229, i.e. the ends opposite the pivot pins 233, abut one against the other.

The brackets 229 can have an arcuate shape and substantially cylindrical or frustum-conical inner surfaces 229A, the shape of which corresponds to the outer shape of the side wall of the capsule C. When the brackets 229 are in the closed position, the cylindrical or frustum-conical inner surfaces 229A thereof thus define a closed surface corresponding to the outer side surface of the capsule C.

The piston 227 is provided with a closure surface 227A facing the plate 215 and designed to press against the top surface of a capsule C. The piston 227 is slidingly housed in the cylinder and is pushed by compression springs 228 against the bottom of the cylinder 225. A pressurized fluid chamber is thus formed between the bottom of the cylinder 225 and the surface 227B of the piston 227 opposite surface 227A.

The brewing chamber portion formed by the central area 215B of the plate 215 is therefore directly connected to the side panels 205. The plate 215, the side panels 205 and the hydraulic device 221 form a closed structure, in which the brewing chamber portions are movably arranged and by which the brewing chamber is surrounded. These portions can be dimensioned and manufactured with a rather high degree of precision, to ensure a correct operation of the brewing chamber, in particular a correct closure thereof around the capsule C. The water heater, on the other hand, can be connected to the structure also with some degree of clearance or backlash. When the brewing unit is operated, the brewing chamber closes and pressurized water is fed through the capsule C housed in the brewing chamber. The axial force generated by the pressure in the brewing chamber during a brewing cycle, as described here below, is supported by the structural frame formed by the body of the hydraulic device 221, the side panels 205 and the body of the water heater 207. Force is transmitted to the body of the water heater 207 through the opposite projections 207D. Clearances or backlashes can be recovered or taken up by elastic deformation of the side panels 205.

In order to close the brewing chamber a pressurized fluid flows through a duct 235 in the pressurized fluid chamber defined by the inner surface of the cylinder 225 and the surface 227B of the piston 227. The pressurized fluid biases the piston 227 against the action of the springs 228 such as to press the surface 227A against the top surface of a capsule C. The pressurized fluid can be cold water fed by the same pump which feeds pressurized water to the water heater 207 or a different pump.

Hot water dispensed by the water heater 207 flows through duct 237 into a hot water chamber 239 (see in particular FIGS. 28 and 29) formed in the piston 227. A port connects the hot water chamber 239 to a plenum 241 which is in turn in fluid connection with a duct 243 ending on the surface 227A of the piston 227. A calibrated valve 245 closes the port between the chamber 239 and the plenum 241 until the pressure in the hot water chamber 239 has reached a pre-set value, for example in the range of 8-20 bar.

The operation of the brewing unit 202 is clearly shown in the sequence of FIGS. 26 and 27. When the hydraulic device 221 is open (FIG. 26), i.e. the piston 227 is entirely retracted in the cylinder 225 under the effect of the springs 228, a capsule C can be introduced in the brewing unit 202. In some embodiments, a spent capsule C0 used in the previous brewing cycle is still retained between the brackets 229 (see FIG. 26). The new capsule C is therefore pushed between the brackets 229 from above and forces the brackets 229 to open against the action of the springs 234. The spent capsule C0 retained between the brackets 229 is therefore released and falls down by gravity into a collecting tray, not shown. The new capsule is C pushed between the brackets 229 which close around the new capsule due to the force applied by the springs 234.

In some embodiments, as shown in FIGS. 26 to 32, the new capsule C is pushed between the brackets 229 by means of a pivoting arm 230 hinged at 232 to a fixed structure of the machine, not shown. The pivoting arm 230 carries a lever 236 hinged at 238 to arm 230. The lever 236 in turn comprises two portions 236A, 236B oriented at approximately 90° one to the other. The portion 236A forms a pusher which pushes the capsule C between the brackets 229. The portion 236B carries a dummy capsule 240 for the purposes, which will be explained later on.

Once the capsule C has been positioned between the brackets 229, pressurized water is fed through duct 235 to force the piston 227 against the capsule C until the front surface 227A of the piston 227 sealingly engages the top surface of the capsule C. The thrust exerted by the piston 227 also causes the capsule C to press with the bottom surface thereof against the plate 215, thus sealingly engaging the capsule there against. A brewing chamber is therefore formed by surface 227A of piston 227, brackets 229 and plate 215. In some embodiments the cylindrical or frustum-conical side wall of capsule C is sufficiently strong to resist the inner pressure generated by the water, such that no special measures are required to keep the brackets 229 in the closed position. In other embodiments, the piston 227 can be provided with locking pins or similar locking devices which engage with the brackets 229 such that any side swelling of the capsule C due to inner pressure is prevented by the brackets 229 being locked in their closed position by said locking pins.

Once the brewing chamber is closed, as shown in FIG. 27, hot pressurized water flows from the water heater 207 through duct 237 in chamber 239. Once the pressure reaches the opening pressure of valve 245, the latter opens and the pressurized hot water flows into and through the capsule C. The pressurized hot water extracts the flavours from the ingredients (e.g. coffee powder) contained in the capsule and the beverage thus produced exits the brewing chamber through hole 215C and duct 219. The latter is connected to a beverage dispensing spout (not shown) from which the beverage is dispensed in a container.

The pushing force exerted by the pressurized water during brewing on the opposing surfaces 227A of piston 227 and 215B of plate 215 is discharged on the structural frame formed by the water heater 207, the side panels 205 and the cylinder 225 of hydraulic device 221.

The water heater 207 is arranged close to the brewing chamber such that the length of the hot water duct from the water heater 207 to the brewing chamber is reduced, thus minimising on the one side the heat losses and on the other the amount of water between the water heater and the brewing chamber which reduces the temperature of the beverage dispensed during the first brewing cycle after a period of standby of the brewing unit.

In this embodiment, moreover, the dispensing duct 219 from which the beverage is dispensed extends through the empty cavity 207C of the water heater 207, such that the temperature of the beverage is maintained or at least temperature reduction is limited to a minimum, thus obtaining a hotter beverage at the dispensing spout of the machine. Moreover, when the water heater 207 is turned on, the dispensing duct 219 is maintained at a temperature above ambient temperature even before a first brewing cycle is performed following turning on of the coffee machine in which the brewing unit is arranged, or following a prolonged standby interval. Thus, also the first beverage dispensed by the brewing unit is relatively hot.

The embodiment shown in FIGS. 23 to 32 is designed for use in combination with capsules having permeable top and bottom surfaces, such that no perforation means are required. In some other embodiments, not shown, a perforator for the top or the bottom surface of the capsule, or for both surfaces can be provided.

As mentioned above, moreover, the embodiment of FIGS. 23-32 is provided with a dummy capsule 240 carried by the pivoting arm 230. A dummy capsule is a body having a shape approximating the shape of the capsule C, provided with a through hole 240A (FIGS. 26-32). The dummy capsule can also be provided with two opposite impressions 240B surrounded by annular ridges 240C. During a normal brewing cycle (FIGS. 26, 27) the dummy capsule 240 is kept in a cleared position, folded against the lower surface of the pivoting arm 230, such that it does not interfere with the brewing unit 202.

When the brewing unit must undergo a washing or de-scaling cycle, water or a washing medium must circulate through the hydraulic circuit of the machine, including the water heater 207, the brewing chamber and the coffee dispensing duct 219. Since the brewing chamber is not sealed, any fluid used during a washing or de-scaling cycle would drip out and would not properly flow through the circuit up to the beverage dispensing spout. By interposing the dummy capsule 240 between the surface 227A of piston 227 and the plate 215 and by pushing the piston 227 against the dummy capsule 240, a sealed hydraulic circuit is formed between the piston 227 and the beverage dispensing spout, such that water or a washing medium can correctly flow therethrough. The dummy capsule 240 is slightly larger in diameter than a normal capsule C, such that once it is pushed between the brackets 229, the latter are kept spread apart (see in particular FIG. 32) and the dummy capsule 240 can easily be recovered by simply lifting the pivoting arm 230.

By supporting the dummy capsule 240 on the pivoting arm 230, loss of the dummy capsule is prevented. Also, after a washing or de-scaling cycle has been completed, the dummy capsule is retracted from the brewing unit 202 and does not fall in the exhausted-capsule tray underneath the brewing unit.

A dummy capsule as described above can be used in any brewing unit provided with an arm or a lever arranged for pushing capsules into the brewing unit.

Thus, according to a further aspect, the invention also concerns a brewing unit for the production of beverages including a brewing chamber, means for opening and closing the brewing chamber, a movable unit, such as a pivoting arm or lever, for pushing a capsule into the brewing unit, wherein said movable unit supports a dummy capsule. Advantageously, the dummy capsule is movably supported on said movable unit, such that it can take an active position or an inactive position with respect to the movable unit. In the inactive position, the dummy capsule does not interfere with the brewing unit. In the active position the dummy capsule enters the brewing unit in replacement for a normal capsule. In preferred embodiments the dummy capsule is supported by a pivoting arm having two portions forming an angle therebetween, such as a 90° angle. One portion forms a capsule pusher for pushing normal capsules in the brewing unit. The other portion is integral with the dummy capsule.

Embodiment of FIGS. 33-36

FIGS. 33-36 show a further embodiment of a brewing unit according to the invention.

The brewing unit, labelled 302 as a whole, comprises a fixed shell 310 and a block 312 arranged on top of said fixed shell 310 and constrained thereto. The fixed shell 310 and the block 312 are mounted in a fixed position inside a coffee machine, such as coffee machine 1 in FIG. 22. The shell 310 encloses two portions of a brewing chamber and houses a structural frame which surrounds the brewing chamber and on which the forces generated inside the brewing chamber during the brewing process are discharged.

In some embodiments the structural frame includes two lateral tie rods 311. Each tie rod 311 can be made of a metal sheet or any other suitable material.

First ends 311A of the two tie rods 311 are connected to one another by a transverse shaft 313. The opposite second ends 311B of the tie rods 311 are shaped such as to form a connector member for connection to a water heater 315. In some embodiments the ends 311B of the tie rods are provided with a through hole, to provide a mechanical connection to corresponding protrusions 315A provided on the outer surface of the water heater 315.

The two tie rods 311, the shaft 313 and the water heater 315 are structurally connected to form said structural frame which receives the forces generated in the brewing chamber during brewing. The water heater 315 forms therefore a structural component of said frame.

In some embodiments the water heater 315 comprises a main body 315B, e.g. formed by a block made of metal, such as aluminum or an aluminum-based alloy, or other heat-conductive material. The protrusions 315A are preferably formed on the outer side surface of the main body 315B. The main body 315B can be made by pressure die-casting. The protrusions 315A can be formed integrally with the main body 315B in a single die-casting manufacturing step.

In some embodiments, in the main body 315B an electric resistor 315C and a water duct 315D are enclosed. Both the electric resistor 315C and the water duct 315D can be helically wound around an axis of the body 315B of the water heater 315. The connectors of the electric resistor 315D to a power line are labelled 316. The input end of the water duct 315D is connected via a connecting pipe to a water pump (not shown). The output end of the water duct 315D has a connector 318 from which hot pressurized water is fed to the brewing chamber, as will be disclosed later on.

Such a water heater is a so-called instant or flow-through water heater, i.e. one in which a very small amount of water is contained in the helically shaped water duct 315D and wherein the electric resistor 315C is sufficiently powerful to heat the water while it is fed through the water heater 315 during use. In less advantageous embodiments a different water heater can be used instead, such as a boiler with an accumulation vessel in which a larger amount of hot water is maintained at the required temperature by a smaller resistor.

What is important is that the water heater forms a structural component of the frame supporting the brewing chamber.

In some embodiments the brewing chamber comprises two portions. In the embodiment shown in FIGS. 33-36 the brewing chamber includes a first brewing chamber portion 321 and a second brewing chamber portion 323. In some embodiments the first brewing chamber portion 321 is mounted fixed with respect to the frame including the tie rods 311, the shaft 313 and the water heater 315 and adjacent the water heater. Preferably the first brewing chamber portion 321 is in heat-contact with the body of the water heater 315, for example attached to or supported by the water heater 315.

In the embodiment shown in FIGS. 33-36 the first brewing chamber portion 321 is housed in a seat 322 rigidly constrained to the body of the water heater 315. The seat 322 can be formed integrally with the body 315B of the water heater 315, e.g. it can be manufactured with the remaining part of the body 315B and with the protrusions 315A in a single moulding or die casting manufacturing step. The water heater 315 is thus in heat contact with the brewing chamber portion 321 through said seat 322. Heat contact means that heat can be transmitted from the main body 315B of the water heater 315 to the brewing chamber portion 321 by conduction, such that the water heater 315 can keep the brewing chamber portion 321 at a temperature above ambient temperature due to heat conduction.

The first brewing chamber portion 321 is additionally directly connected to the tie rods 311 by means of screws, rivets or other constraining members, shown by way of example at 320. The fixed brewing chamber portion 321, the tie rods 311 and the transverse shaft 313 thus form a closed structure enclosing or surrounding the brewing chamber. The brewing chamber portion 321 is therefore connected to the closed structure, and in particular to the tie rods forming the side components thereof, independently of the water heater 315, the protrusions 315A of which form separate constraining members for connection to said tie rods 311.

The brewing chamber portions are movably housed in the closed structure formed by the first brewing chamber portion 321 itself, the tie rods 311 and the end component formed by the transverse shaft 313. These components can be designed with sufficient precision to reduce tolerances such that the brewing chamber operates correctly, e.g. correctly seals the inner volume of the brewing chamber during the brewing cycle.

The second brewing chamber portion 323 is movable with respect to the first brewing chamber portion 321 according to the double arrow f323 along a direction substantially parallel to the axis A-A of the brewing chamber. More specifically, the second brewing chamber portion 323 is connected to the transverse shaft 313 through a mechanical connection arrangement forming a manual control actuator arranged to control the movement of the second brewing chamber portion 323, as will be described in greater detail later on.

One or both said brewing chamber portions can be provided with perforation means to perforate a capsule C containing the ingredients for producing the coffee beverage or any other edible product by infusion.

In the embodiment shown in the drawings the movable brewing chamber portion 323 is provided with perforators 325 extending through holes provided in a disc member 327 slidably arranged in the movable brewing chamber portion 323. The disc member 327 is provided with a sealing ring 329 co-acting with an annular edge of the opposite fixed brewing chamber portion 321. When the brewing chamber is closed and the brewing cycle starts, hot water flowing from the water heater 315 and exiting the connector 318 enters the brewing chamber through a duct 324 from the side of the movable brewing chamber portion 323. A flexible pipe 318A connects the duct 324 and the connector 318, allowing the closing and opening movement of the two brewing chamber portions. The pressurized hot water flows through the holes provided in the disk member 327 and enters the capsule C through apertures punched in the top surface of the capsule by the perforators 325.

Springs (not shown) push the disc member 327 away from the bottom of the housing formed by the outer substantially cylindrical wall of the movable brewing chamber portion 323, such as to remove the capsule C from the perforators 325 after brewing has taken place.

The fixed brewing chamber portion 321 is cup-shaped and near the bottom thereof a plate 331 is arranged, which is provided with perforating protrusions 333. The protrusions 333 are apertured such that the beverage extracted from the ingredients contained in the brewing chamber exits the brewing chamber through passages extending along the protrusions 333 and is dispensed through a dispensing duct 334.

A substantially cylindrical hollow member 335 can be housed inside the brewing recess of the movable chamber portion 323. The cylindrical hollow member 335 can be provided with an inner wall 335A having a shape reproducing the shape of the outer side surface of the capsule C, in the illustrated example an approximately frustum-conical shape. The hollow member 335 is elastically biased by a spring 337 arranged between the cylindrical hollow member 335 and the bottom of the fixed brewing chamber portion 321. Said cylindrical hollow member 335 acts as an ejector to eject the capsule C from the inside of the fixed brewing chamber portion 323 after brewing.

The dispensing duct 334, from which the beverage is dispensed extends across the body 315B of the water heater 315. Preferably, the body 315B of the water heater 315 is axially hollow as shown at 315E and has a front through hole 315F such that the dispensing duct 334 can be connected to a beverage dispensing spout 5A of the machine in which the brewing unit is arranged.

This special arrangement ensures that the dispensing duct 334 is heated up and is brought at an above-ambient temperature even before the first brewing cycle is performed. Heating of the dispensing duct 334 is achieved by heat convection from the water heater 315. The intimate contact between the fixed brewing chamber portion 321 and the body 315B of the water heater 315 is such that the larger one of the two brewing chamber portions is heated by the same resistor which heats the brewing water before the brewing cycle starts. Both measures results in a hot beverage being dispensed already from the very first beverage portion dispensed by the brewing unit 302.

The use of two perforators to perforate the bottom surface and the top surface of a capsule C is not mandatory. However providing two perforators allows the use of sealed capsules, made of plastic, metallic sheet or other suitable material. The possibility of omitting one or the other, or both perforators, is not excluded, for example when capsules are used, which open by the effect of the water pressure outside and/or of the drink pressure inside the capsule or when capsules are used which have one or both opposed faces provided with a water-permeable area, for example closed with a non woven cloth or a filter made of paper or other permeable material.

While the fixed brewing chamber portion 321 is fixedly supported on the tie rods 311, the movable brewing chamber portion 323 is slidingly supported within the frame formed by the first brewing chamber portion 321, the tie rods 311 and the shaft 313. More specifically, the movable brewing chamber portion 323 can be provided with pairs of laterally projecting pins 323A which are slidingly engaged into slots 310A of the outer shell 310. The pins 323A have an elongated cross-section such that a pair of such pins is sufficient to conveniently guide the movable brewing chamber portion 323 avoiding tilting thereof.

The movement of the movable brewing chamber portion 323 is controlled by a crank 341 hinged about the shaft 313 and pivoted at 343 to a corresponding pair of rods 347. The rods are in turn hinged at 348 to the movable brewing chamber portion 323. The movement of the brewing chamber portion 323 can be controlled by means of a tie rod 349 hinged at 343 at the pivot which connects the crank 341 and the rods 347. The tie rod 349 is in turn pivoted at 350 to a control lever 356 pivotally engaged at 357 to the shell 310.

The rotation of the control lever 356 about the hinge 357 according to double arrow f356 causes the rotation of the crank 341 about the shaft 313. The rotary motion of the crank 341 is transformed by the crank-rod connection 341-347 into a translation motion of the movable brewing chamber portion 323.

Other kinds of actuating mechanisms can be used to control the closing and opening of the brewing chamber. For example an electric motor or a hydraulic or pneumatic actuator can be used, which acts for example on a shaft controlling the movement of the crank 341.

According to the embodiment shown in FIGS. 33 to 36 the capsule C is introduced into the brewing chamber by gravity. For that purpose, an aperture or slot 360 is provided on a top surface 312A of the block 312. The capsule C is caused to fall according to arrow F1 (FIG. 34) through the aperture or slot 360.

When the brewing chamber is in its open position (FIGS. 33, 34), a mobile deviating member 363 hinged by means of a pin 361 to the upper block 312 is arranged underneath said aperture 360. The pivoting pin 361 is preferably parallel to the shaft 313 and to the pivoting axes of the transmission members 356, 349, 347, 341 described above and orthogonal to the direction f323 of the closing and opening motion of the brewing chamber.

As explained in more detail hereinafter, the mobile deviator 363 aims at guiding and deviating a capsule C towards the inside of the fixed brewing chamber portion 321 and to favour the discharge, i.e. the ejection of the exhausted capsule C after brewing.

The rotation motion according to the double arrow f363 of the mobile deviator 363 around the pin 361 can be imparted preferably by the lever 356. In the illustrated embodiment, this motion is obtained by means of a connecting member between the control lever 356 and the mobile deviator 363. The connection member can comprise a pair of connection rods 368 pivoted at 368A to the control lever 356 and at 368B to an appendage 363A of the mobile deviator 363. The rotary movement of the control lever 356 causes therefore also a pivoting movement of the mobile deviator 363. The latter can take up two end positions, shown in FIGS. 34 and 36 respectively, corresponding to the open position and closed position of the brewing chamber, respectively.

In the first position, the mobile deviator 363 is arranged under the aperture or slot 360 such that the capsule C introduced through the slot 360 is deviated by the mobile deviator 363 towards the fixed portion 321 of the brewing chamber. In the second position (FIG. 36) the mobile deviator 363 is placed above the brewing chamber. The movement of the mobile deviator 363 controlled by lever 356 is phased such that mobile deviator is moved away from the path of the movable brewing chamber portion 323 in advance of the closure of the brewing chamber, such as not to interfere with the closing movement.

Figure 33:
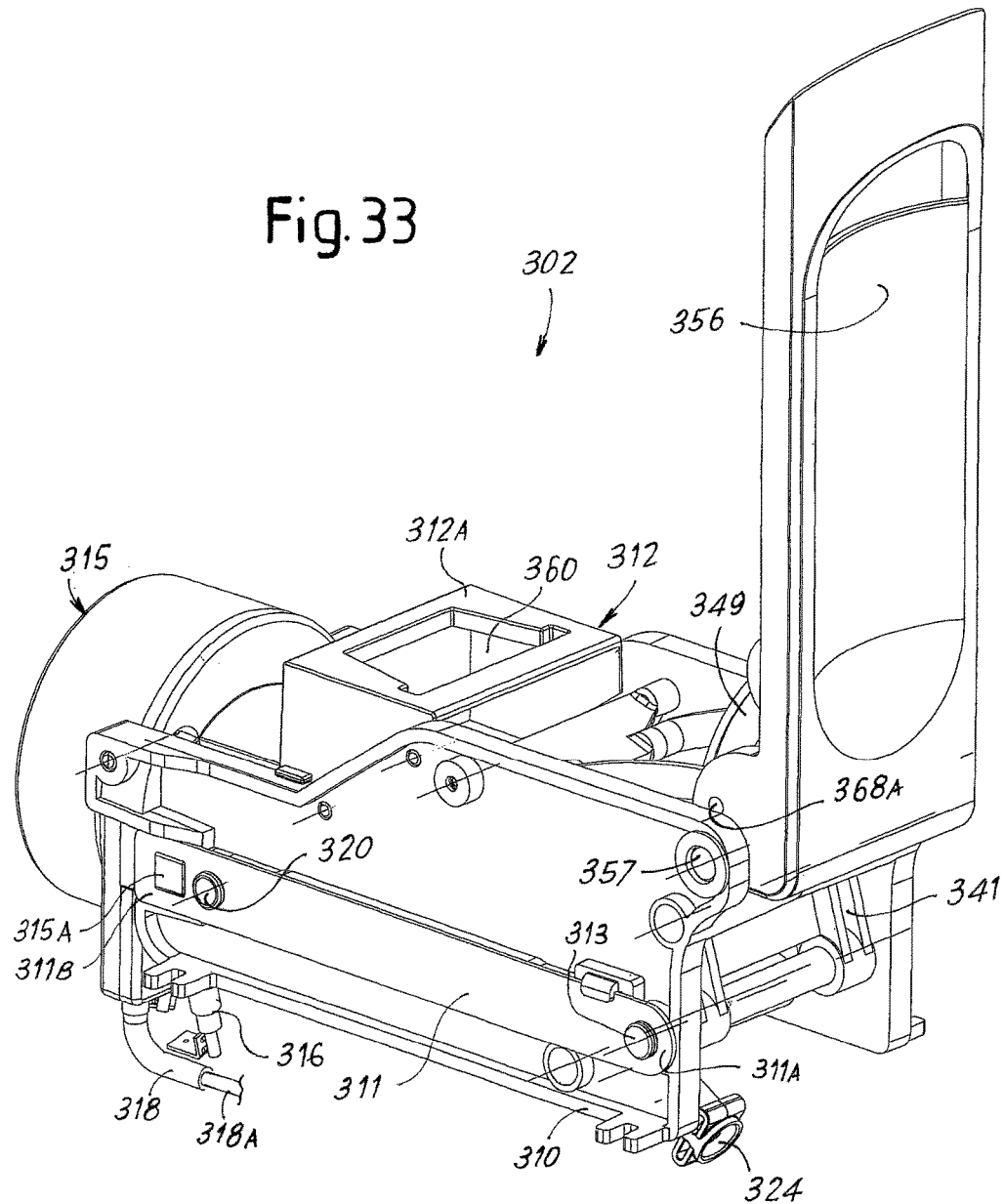
FIG. 33 shows a perspective view of a brewing unit according to a further embodiment.
Figure 34:
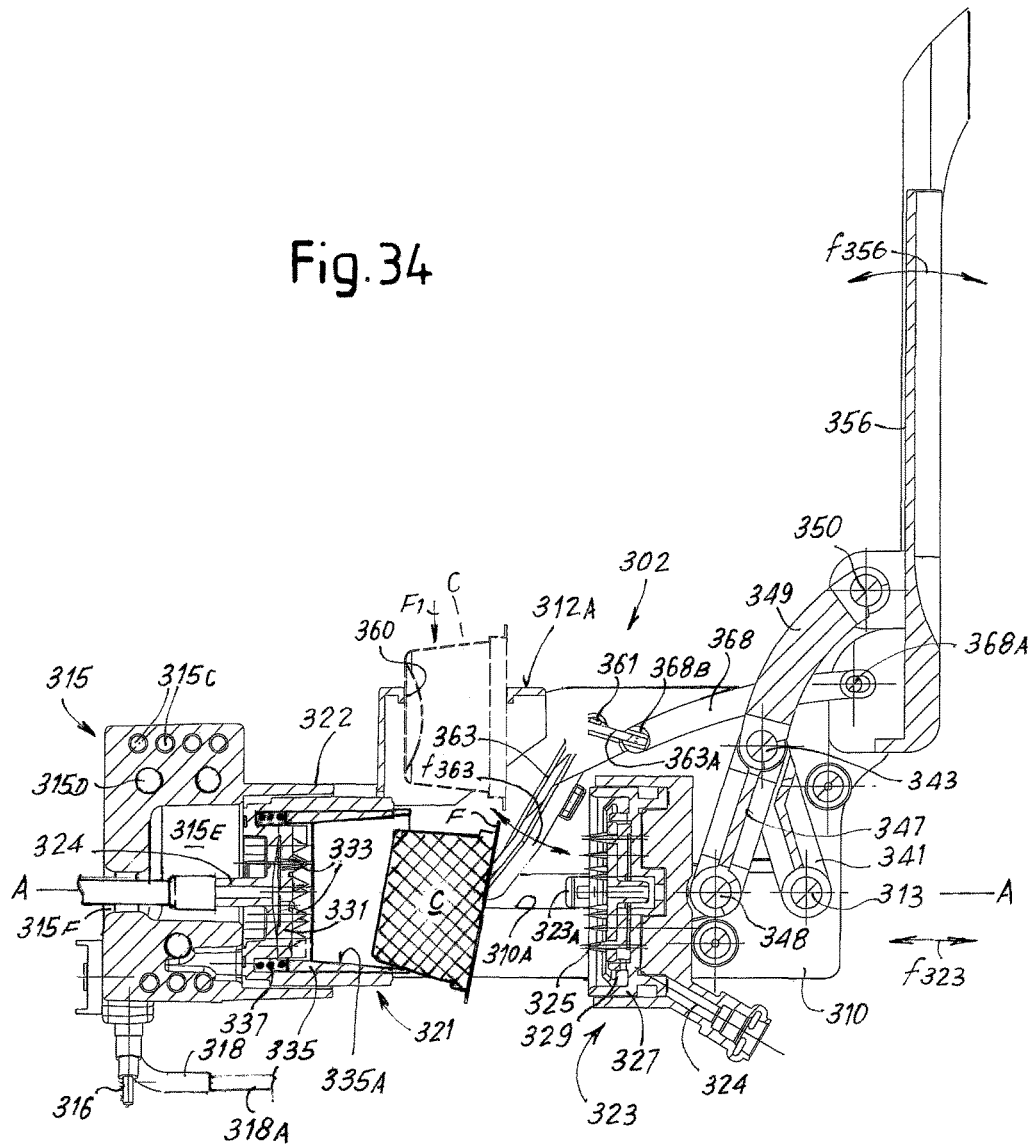
FIG. 34 shows a section of the brewing unit of FIG. 33 according to a vertical longitudinal plane.

The operation of the brewing unit 302 described so far is as follows. In FIGS. 33 and 34 the brewing unit 302 is open. The aperture 360 is accessible for the introduction of a capsule C in the brewing unit. The capsule C falls by gravity into the brewing unit 102, reaching the position shown in solid line in the cross section of FIG. 34. During its falling movement the capsule C meets the chute mobile deviator 363 and is stopped thereby. The mobile deviator 363 is in a position such that the capsule C, by meeting the mobile deviator 363, is deviated with the bottom thereof towards the brewing recess formed in the interior of the fixed brewing chamber portion 321. The capsule C is retained in this position until the brewing unit is closed acting on the control lever 356, resting with the top surface against the mobile deviator 363 and with the side surface against the edge of the fixed brewing chamber portion 321.

Figure 35:
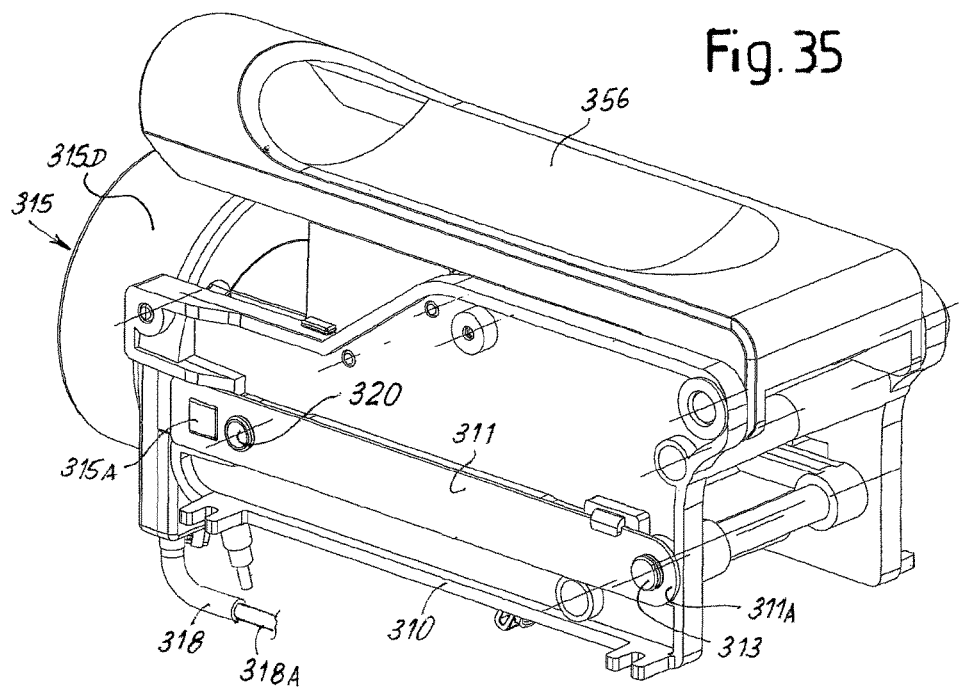
FIG. 35 shows a perspective view similar to FIG. 33 with the brewing unit in a closed position.
Figure 36:
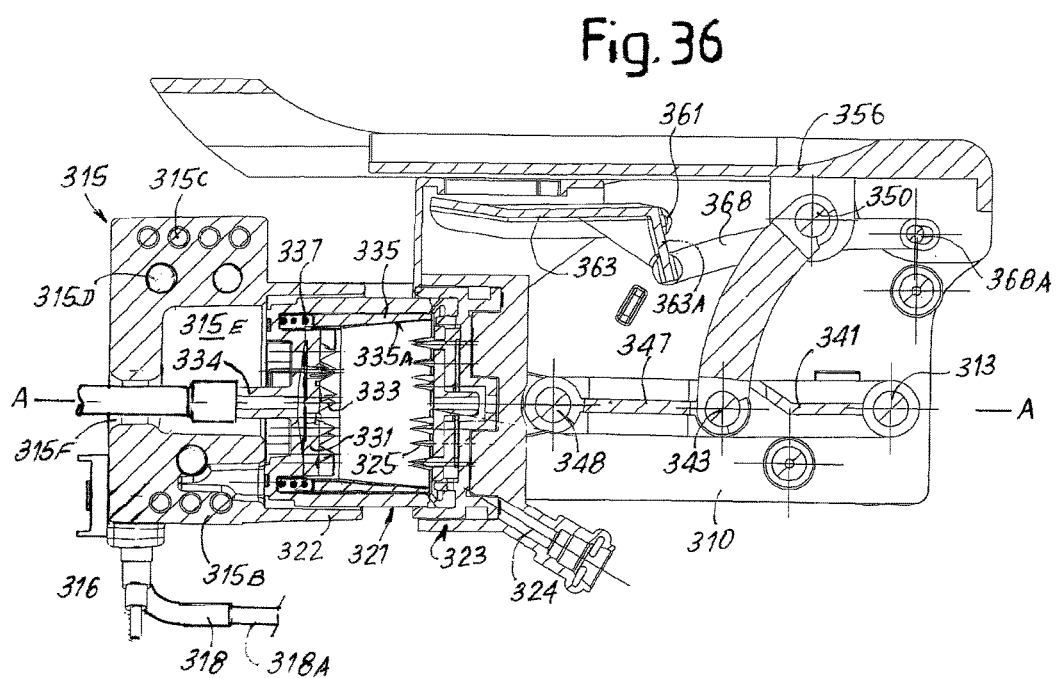
FIG. 36 shows a section of the brewing unit in a closed position.

By actuating the control lever 356 downwards, the brewing chamber is closed (FIGS. 35, 36). During the closing motion the mobile deviator 363 is gradually lifted and clears the area where the mobile brewing chamber portion 323 moves approaching the fixed brewing chamber portion 321. The lifting pivoting motion around the pin 361 is controlled by the control lever 356 via rods 368.

In the closed position the flange F of the capsule C is sealingly engaged between the edge of the fixed brewing chamber portion 323 and the seal 329 of the mobile brewing chamber portion 323. The projections of the perforators 325 and 333 penetrate respectively in the front surface and in the bottom surface of the capsule C allowing hot pressurized water to flow through the capsule and the ingredients contained therein to extract the flavours for the production of the beverage.

The axial force generated on the two brewing chamber portions 321, 323 by the water pressure during brewing is supported by the structural frame formed by the water heater 315, the tie rods 311 and the transverse shaft 313. The first brewing chamber portion 321 is pushed by the water pressure against the water heater adjacent to and in contact with said first brewing chamber portion 321. Possible clearances or backlashes between the components of the closed structure and the water heater 315 are taken up by elastic deformation, in particular of the tie rods. The body of the water heater 315, therefore, supports the force generated by the water pressure on the structure housing the brewing chamber.

Once the brewing cycle has ended, with a reverse rotary motion of the control lever 356 the brewing chamber 321, 323 is opened again. The mobile deviator 363 is pushed downwards by the arms 368 such as to push against i the capsule C. The latter is ejected or at least partially taken off from the recess of the fixed brewing chamber portion 321 by the elastic thrust exerted by the springs 337 on the hollow member 335, thus preventing the capsule C from remaining inside the fixed brewing chamber portion 321. The push exerted on the upper side on the capsule C by the mobile deviator 363 avoids that the capsule C can remain adhering to the mobile brewing chamber portion 323. The exhausted capsule C is thus reliably discharged by gravity.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A brewing unit for production of a beverage, comprising:
    a brewing chamber comprising a first brewing chamber portion and a second brewing chamber portion, wherein at least one of the first and the second brewing chamber portions is movable with respect to the other, the at least one of the first and the second brewing chamber portions being mechanically connected to an actuator;
    a water heater supplying pressurized water to the brewing chamber during brewing of the beverage; and
    a structural frame supporting the first and the second brewing chamber portions, wherein forces generated by the pressurized water in the brewing chamber during the brewing are exerted on the structural frame;
    wherein said structural frame comprises:
        two lateral components arranged laterally along a length of said brewing chamber; and
        two end components arranged transverse to the two lateral components and mechanically constrained to said two lateral components at opposite ends of the two lateral components, a first end component of said two end components comprising the first brewing chamber portion, wherein the first brewing chamber portion is constrained to the two lateral components,
    wherein said two lateral components and said two end components are configured to form a closed structure surrounding the brewing chamber,
    wherein said first brewing chamber portion of the first end component of the closed structure is arranged adjacent to said water heater, the water heater being arranged outside the closed structure,
    wherein the water heater is constrained to the two lateral components outside the closed structure,
    wherein said first brewing chamber portion and said water heater are each constrained to said two lateral components independently, one from the other, via separate constraining members,
    wherein during the brewing, the first brewing chamber portion is pressed by an axial force generated by the pressurized water in the brewing chamber against the water heater,
    wherein the axial force generated by the pressurized water in the brewing chamber during the brewing is exerted on said water heater and causes elastic deformation of at least one of the two lateral components to maintain the first brewing chamber portion in a closed position during the brewing, and
    wherein the water heater contributes to a mechanical resistance of the structural frame which supports the forces generated by the pressurized water in the brewing chamber during the brewing.

2. The brewing unit according to claim 1, wherein said first brewing chamber portion is fixed with respect to said closed structure, and wherein the second brewing chamber portion is movable with respect to said closed structure.

3. The brewing unit according to claim 1, wherein said two lateral components and said two end components are fixedly and rigidly connected to one another.

4. The brewing unit according to claim 1, wherein a second end component of the two end components supports the second brewing chamber portion.

5. The brewing unit according to claim 4, wherein said second brewing chamber portion is movable with respect to said structural frame, a manual or servo-actuator being arranged between said second end component and said second brewing chamber portion for controlling a movement of said second brewing chamber portion.

6. The brewing unit according claim 1, wherein said water heater comprises a main body and protrusions, the protrusions engaging into seats provided in said two lateral components.

7. The brewing unit according to claim 1, wherein said two lateral components comprise tie rods.

8. The brewing unit according to claim 1, wherein said two lateral components form guides configured to slidingly engage said second brewing chamber portion.

9. The brewing unit according to claim 1, wherein said water heater is mechanically constrained to said first brewing chamber portion.

10. The brewing unit according to claim 9, wherein a hot water duct for feeding hot pressurized water in said brewing chamber from said water heater connects said water heater to said first brewing chamber portion.

11. The brewing unit according to claim 1, wherein a dispensing duct, from which said beverage is dispensed, extends through a cavity of said water heater.

12. The brewing unit according to claim 1, wherein said water heater is configured to be in one of a direct and an indirect heat contact with said first brewing chamber portion.

13. The brewing unit according to claim 1, comprising an arm for pushing capsules into the brewing chamber, said arm supporting a dummy capsule.

14. The brewing unit according to claim 13, wherein said dummy capsule is movable with respect to said arm to take an operating position and an inactive position.

15. A beverage production machine including a brewing unit, wherein the brewing unit comprises:
   a brewing chamber comprising a first brewing chamber portion and a second brewing chamber portion, wherein at least one of the first and the second brewing chamber portions is movable with respect to the other, the at least one of the first and the second brewing chamber portions being mechanically connected to an actuator;
   a water heater supplying pressurized water to the brewing chamber during brewing of a beverage; and
   a structural frame supporting the first and the second brewing chamber portions, wherein forces generated by the pressurized water in the brewing chamber during the brewing are exerted on the structural frame;
   wherein said structural frame comprises:
      two lateral components arranged laterally along a length of said brewing chamber; and
      two end components arranged transverse to the two lateral components and mechanically constrained to said two lateral components at opposite ends of the two lateral components, a first end component of said two end components comprising the first brewing chamber portion, wherein the first brewing chamber portion is constrained to the two lateral components,
   wherein said two lateral components and said two end components are configured to form a closed structure surrounding the brewing chamber,
   wherein said first brewing chamber portion of the first end component of the closed structure is arranged adjacent to said water heater, the water heater being arranged outside the closed structure,
   wherein the water heater is constrained to the two lateral components outside the closed structure,
   wherein said first brewing chamber portion and said water heater are each constrained to said two lateral components independently, one from the other, via separate constraining members, and
   wherein during the brewing the first brewing chamber portion is pressed by an axial force generated by the pressurized water in the brewing chamber against the water heater,
   wherein the axial force generated by the pressurized water in the brewing chamber during the brewing is exerted on said water heater and causes elastic deformation of at least one of the two lateral components to maintain the first brewing chamber portion in a closed position during the brewing, and
   wherein the water heater contributes to a mechanical resistance of the structural frame which supports the forces generated by the pressurized water in the brewing chamber during the brewing.

16. The brewing unit according to claim 1, wherein the first brewing chamber portion is constrained to the two lateral components by first constraining members, and wherein the water heater is constrained to the two lateral components by second constraining members different from the first constraining members.

17. A brewing unit for production of a beverage, comprising:
   a brewing chamber comprising a first brewing chamber portion and a second brewing chamber portion, wherein at least one of the first and the second brewing chamber portions is movable with respect to the other, the at least one of the first and the second brewing chamber portions being mechanically connected to an actuator;
   a water heater supplying pressurized water to the brewing chamber during brewing of the beverage; and
   a structural frame having two lateral components arranged laterally along a length of said brewing chamber for supporting the first and the second brewing chamber portions,
   wherein the first brewing chamber is constrained to the structural frame,
   wherein the water heater is constrained to the structural frame,
   wherein the first brewing chamber portion and the water heater are each constrained to the structural frame independently, one from the other, via separate constraining members,
   wherein during the brewing, the first brewing chamber portion is pressed by an axial force generated by the pressurized water in the brewing chamber against the water heater, and
   wherein the axial force generated by the pressurized water in the brewing chamber during the brewing is exerted on said water heater and causes elastic deformation of at least one of the two lateral components to maintain the first brewing chamber portion in a closed position during the brewing.

18. The brewing unit according to claim 17, wherein said structural frame comprises
   two end components arranged transverse to the two lateral components and mechanically constrained to said two lateral components, a first end component of said two end components comprising the first brewing chamber portion, wherein the first brewing chamber portion is constrained to the two lateral components,
   wherein said two lateral components and said two end components are configured to form a closed structure surrounding the brewing chamber,
   wherein said first brewing chamber portion of the first end component of the closed structure is arranged adjacent to said water heater, the water heater being arranged outside the closed structure,
   wherein the water heater is constrained to the two lateral components outside the closed structure, and
   wherein said first brewing chamber portion and said water heater are each constrained to said two lateral components independently, one from the other, via the separate constraining members.

19. The brewing unit according to claim 18, wherein the first brewing chamber portion is constrained to the two lateral components by first constraining members, and wherein the water heater is constrained to the two lateral components by second constraining members different from the first constraining members.

20. The brewing unit according to claim 17, wherein the water heater contributes to a mechanical resistance of the structural frame which supports the forces generated by the pressurized water in the brewing chamber during the brewing.

* * * * *